US010493789B2

(12) United States Patent
Dorier et al.

(10) Patent No.: US 10,493,789 B2
(45) Date of Patent: Dec. 3, 2019

(54) SECURITY ELEMENT, SECURITY ARRANGEMENT, METHOD FOR ITS PRODUCTION AND AUTHENTICATION METHOD USING THE SAME

(71) Applicant: SICPA HOLDING SA, Prilly (CH)

(72) Inventors: Jean-Luc Dorier, Bussigny (CH); Benito Carnero, Preverenges (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/063,207

(22) PCT Filed: Dec. 16, 2016

(86) PCT No.: PCT/EP2016/081443
§ 371 (c)(1),
(2) Date: Jun. 15, 2018

(87) PCT Pub. No.: WO2017/103119
PCT Pub. Date: Jun. 22, 2017

(65) Prior Publication Data
US 2018/0361778 A1   Dec. 20, 2018

(30) Foreign Application Priority Data
Dec. 17, 2015   (EP) .................................... 15200957

(51) Int. Cl.
*G06K 19/06*   (2006.01)
*B42D 25/378*   (2014.01)
(Continued)

(52) U.S. Cl.
CPC ......... *B42D 25/378* (2014.10); *B42D 25/382* (2014.10); *B42D 25/387* (2014.10);
(Continued)

(58) Field of Classification Search
USPC .................................................. 235/487–494
See application file for complete search history.

(56) References Cited

U.S. PATENT DOCUMENTS

| 7,687,271 B2 | 3/2010 | Gelbart |
| 2004/0231554 A1 | 11/2004 | Udagawa et al. |

(Continued)

FOREIGN PATENT DOCUMENTS

| EP | 1953684 | 8/2008 |
| GB | 2324065 | 10/1998 |

(Continued)

OTHER PUBLICATIONS

D.M. Sturmer, The Chemistry of Heterocyclic Compounds, vol. 30, John Wiley, New York, 1977, pp. 441-587; Eastman Kodak.
(Continued)

*Primary Examiner* — Jamara A Franklin
(74) *Attorney, Agent, or Firm* — Muncy, Geissler, Olds & Lowe, P.C.

(57) ABSTRACT

A security element comprising a first and a second pattern formed in or on a substrate is described, the first pattern (105; 205) being formed by discrete elements (105a-105g; 205a-205c) of a first material that are distributed over a first region (101) of the substrate (100; 200), the second pattern (106; 206) being formed by discrete elements (106a-106i; 206a-206c) of a second material that are distributed over a second region (102) of the substrate (100; 200), said second material being different from said first material, said first and second regions of the substrate overlapping, wherein the discrete elements of at least one of the first and second patterns are distributed randomly, a part of the discrete elements of the first pattern (105; 205) overlap with a part of the discrete elements of said second pattern (106; 206), and the security element is defined by the first pattern (105; 205), the second pattern (106; 206) and a third pattern (107; 207)
(Continued)

associated with the overlap of some or all of the discrete elements of said first and second patterns.

16 Claims, 24 Drawing Sheets

(51) Int. Cl.
*B42D 25/382* (2014.01)
*B42D 25/387* (2014.01)
*B42D 25/405* (2014.01)
*G07D 7/1205* (2016.01)
*G06K 7/10* (2006.01)
*B42D 25/29* (2014.01)
*B42D 25/373* (2014.01)

(52) U.S. Cl.
CPC ....... *B42D 25/405* (2014.10); *G06K 7/10722* (2013.01); *G06K 19/06046* (2013.01); *G07D 7/1205* (2017.05); *B42D 25/29* (2014.10); *B42D 25/373* (2014.10); *G07D 2207/00* (2013.01)

(56) References Cited

U.S. PATENT DOCUMENTS

2005/0120907 A1 6/2005 Aoyama et al.
2009/0074231 A1 3/2009 Rancien
2013/0320099 A1 12/2013 Acton et al.

FOREIGN PATENT DOCUMENTS

| WO | 1998045826 | 10/1998 |
| WO | 2005104008 | 11/2005 |
| WO | 2009010714 | 1/2009 |
| WO | 2013033009 | 3/2013 |

OTHER PUBLICATIONS

J.B. Marling, J.H. Hawley, E.M. Liston, W.B. Grant, Applied Optics, 13(10), 2317-2320 (1974).
Nobuyuki Otsu (1979). "A threshold selection method from gray-level histograms". IEEE Trans. Sys., Man., Cyber. 9 (1): 62-66.
L.G. Shapiro, G. Stockman, "Computer Vision," Prentice Hall, 2002, pp. 82-91.
R. C. Gonzalez, R. E Woods, "Digital Image Processing," Third Edition, Pearson-Prentice Hall, 2008, 122 pages.
Industrial Color Physics, Klein, Georg A., Springer Series in Optical Sciences, vol. 154, 2010, XIV, 521 pages.
Quantification of histochemical staining by color de-convolution, by Ruifrok AC, Johnston DA., in Anal Quant Cytol Histol. Aug. 23, 2001(4), 291-9), 21 pages.
Landin G. (2004). Colour Deconvolution plugin for Image J and Fuji. Oral Pathology Unit, School of Dentistry, University of Birmingham, 6 pages.

Figure 24
Figure 24a
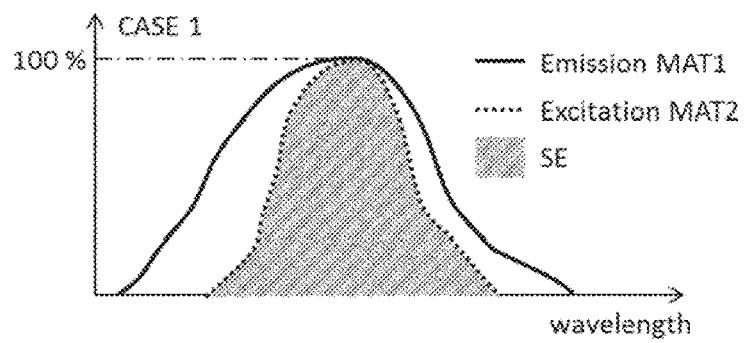
Figure 24b
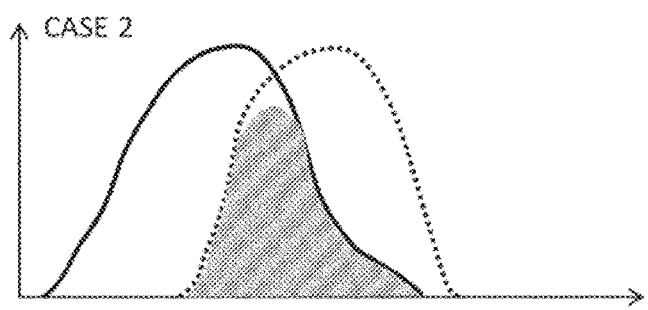

SECURITY ELEMENT, SECURITY ARRANGEMENT, METHOD FOR ITS PRODUCTION AND AUTHENTICATION METHOD USING THE SAME

TECHNICAL FIELD

The present invention is in the field of security elements and authentication methods, as used for verifying the origin, genuineness and/or authenticity of items such as products or documents of value.

BACKGROUND OF THE INVENTION

Many products of commercial value need to be protected against counterfeiting, forging and copying. To this end, products of high value, such as perfumes or watches, as well as documents of value, such as banknotes, tax stamps, credit cards etc., are typically provided with security elements.

Typical security elements include for instance holograms, markings with luminescent dyes or pigments emitting in the visible spectrum upon excitation by e.g. UV radiation, watermarks, or graphical elements using a specific kind of pigment that is not easily available and/or which provides an optical impression by a specific orientation of the pigment that is difficult to achieve with commercially available equipment. An example of the latter is e.g. the so-called "rolling bar" effects that can be provided by orienting magnetic non-spherical particles.

A drawback of such security elements is that they may be relatively easy to reproduce and/or are not machine-readable. Further, the security elements are typically provided in an identical manner on products of the same type, so that they cannot be used to identify a specific product and cannot be used to distinguish between different products of the same type. This is however desirable in many commercial fields, as this allows to track a product over the distribution chain to identify stolen goods.

In order to solve these problems, the prior art suggests using specific kinds of codes, such as alphanumeric product verification codes, barcodes or QR codes. However, the problem of such codes is that the information contained therein can be easily decoded. It is further possible for counterfeiters to predict, within certain boundaries, a code that could be considered authentic, as the algorithms used for the production of such codes are in the public domain or can be obtained by analysing the information provided on a series of authentic products.

In order to address these problems of pre-designed codes, the prior art suggests using random distribution features that are unique for each product and stored in a database, to thereby allow to identify a product as genuine by comparison with database entries. The random distribution forms a security feature that cannot be predicted, as it is not a pre-designed code.

One document describing such a technology is GB 2 324 065 A, which describes an identification code for banknotes or credit cards comprising a pattern of random beads in a plastic matrix. The position of the beads inside the plastic matrix is unique for each product, such as credit card or banknote, and e.g. the position of a sequence of beads above or below a line represents the ones and zeroes in a binary code that is used for identifying the product.

A similar technology is described in EP 1 953 684 A1, which describes an authentication means including a random arrangement of stains. This document describes that such a unique arrangement of stains can be obtained e.g. by spraying an ink, which can be conventional or covert such as to be detectable only under specific illumination conditions. The random arrangement of stains forms a machine-readable code that can be read out by image processing, forming a descriptor or data set that corresponds to the stains arrangement. A related technology using invisible taggants that are randomly positioned inside a material as matrix, forming a random pattern that can be used for authentication by comparison with a database, is described in U.S. Pat. No. 7,687,271 B2.

A common problem of all the technologies described above is that the formation of the arrangement of stains or taggants, and subsequently the registration of the resulting pattern, is performed in a database at a single place, i.e. a place of manufacture. Nowadays many commercial goods are however prepared in multi-step processes performed at different sites or by different manufacturers. One example is the production of a jet engine where the blades of the turbine may be prepared from a specific highly resistant material produced at a first site, and the engine is assembled at another site by qualified mechanics. In such a case, it would be desirable to have available a means for securing that the right material has been used and that the assembly has been correctly conducted. A security element providing authentication for either one of these will not be sufficient to prove both, and a single security element clearly identifying a specific produced item and capable of tracing the course of manufacture in a simple, yet unique manner is desired.

Problems Solved by the Present Invention

The present invention generally aims at providing a new security element capable of improving the security level provided by prior art security elements.

It is a particular object of the present invention to provide a security element that provides a high level of security in that it is extremely difficult to counterfeit or reproduce and that cannot be predicted from a series of genuine products, yet that can be prepared at low costs with uncomplicated equipment. It is a further object of the present application to provide such a security element that provides several levels of security in that it contains different patterns that are revealed under different conditions, such as different viewing conditions, to thereby increase the security level with respect to prior art random distribution security features.

It is a further object of the present invention to provide a security element that provides a means for securing the genuineness and authenticity of a product or item along the production or distribution chain.

SUMMARY OF THE INVENTION

The present invention can be summarized by the following aspects. Further aspects and preferred embodiments will become more apparent from the following detailed description.

A security element is provided comprising a first and a second pattern formed in or on a substrate,
the first pattern being formed by discrete elements of a first material that are distributed over a first region of the substrate,
the second pattern being formed by discrete elements of a second material that are distributed over a second region of the substrate, said second material being different from said first material, said first and second regions of the substrate overlapping, wherein
the discrete elements of at least one of the first and second patterns are distributed randomly,
a part of the discrete elements of the first pattern overlap with a part of the discrete elements of said second pattern, and
the security element is defined by the first pattern, the second pattern and a third pattern associated with the overlap of some or all of the discrete elements of said first and second patterns.

The security element may be such that the first material (INK1) comprises one or both of a first dye (DYE1) and a first pigment, and the second material (INK2) comprises one or both of a second dye (DYE2) and a second pigment. The security element of this kind is preferably such that one or more of the dyes and pigments present in the first and second materials is luminescent.

The security element according to another embodiment is such that the discrete elements of at least one of the first and second patterns are not visually distinguishable from the substrate. Preferably, the discrete elements of one of the first pattern and the second pattern are not visually distinguishable from the substrate, and the discrete elements of the other of the first pattern and the second pattern are visually distinguishable from the substrate. Herein, "visually distinguishable" and "not visually distinguishable" typically denote the distinguishability, respectively the lack thereof, by the naked eye of a healthy human observer under typical illumination conditions, such as under artificial light of an incandescent lamp.

The security element according to another embodiment is such that the first material (INK1) comprises a first fluorescent dye (DYE1) or pigment, which upon excitation by electromagnetic radiation falling within an excitation wavelength range $\lambda 1a$ of the first fluorescent dye (DYE1) or pigment is capable of emitting electromagnetic radiation in at least one first emission wavelength range $\lambda 1e$, and
the second material (INK2) comprises a second fluorescent dye (DYE2) or pigment, which upon excitation by electromagnetic radiation falling within an excitation wavelength range $\lambda 2a$ of the second fluorescent dye (DYE2) or pigment is capable of emitting electromagnetic radiation in at least one second emission wavelength range $\lambda 2e$,
wherein said first emission wavelength range $\lambda 1e$ of the first fluorescent dye (DYE1) or pigment overlaps with the excitation wavelength range $\lambda 2a$ of the second fluorescent dye (DYE2) or pigment, so that upon irradiation with electromagnetic radiation within the excitation wavelength range $\lambda 1a$ of the first fluorescent dye (DYE1) or pigment the second fluorescent dye (DYE2) or pigment is excited, in the area of overlap of the discrete elements, to emit electromagnetic radiation in the emission wavelength range $\lambda 2e$. The security element may be such that the second emission wavelength range $\lambda 2e$ does or does not overlap with the first emission wavelength range $\lambda 1e$. Furthermore, the security element may be such that $\lambda 1a\text{-max}<\lambda 1e\text{-max}<\lambda 2e\text{-max}$, wherein $\lambda 1a\text{-max}$, $\lambda 1e\text{-max}$, and $\lambda 2e\text{-max}$ denote the wavelengths of the excitation and emission peaks in the respective excitation and emission wavelength regions of the first dye (DYE1) or pigment and the second dye (DYE2) or pigment, respectively.

The security element according to this and other embodiments is preferably such that the randomly distributed discrete elements are obtainable by spraying ink.

According to another embodiment, a commercial good or value document is provided that comprises a security element according to any one of the above embodiments.

According to another embodiment, a security arrangement is provided that comprises a security element according to one of the above embodiments, and a data record of an index for identifying said third pattern. The security arrangement can be such that it also comprises a data record of a first index for identifying said first pattern, a data record of a second index for identifying said second pattern and a data record of a third index for identifying said third pattern.

According to another embodiment, a process for producing a security arrangement as defined previously is provided, comprising the steps of
forming the first pattern by distributing discrete elements of the first material over the first region of the substrate,
forming the second pattern by distributing discrete elements of the second material over the second region of the substrate, said second material being different from said first material and said first and second regions of the substrate overlapping, wherein the discrete elements of at least one of the first and second patterns are distributed randomly, and a part of the discrete elements of the first pattern overlap with a part of the discrete elements of said second pattern,
generating an index for identifying said third pattern, comprising obtaining an image of said third pattern and applying an indexing routine to said obtained image, and
storing said index in a data record.

According to another embodiment, a method for authenticating a security element of a security arrangement is provided, comprising the steps of
obtaining an image of said third pattern and applying a predetermined indexing routine to said obtained image, for generating an index of said third pattern,
accessing a repository of said data records,
comparing said generated index with content from said repository, and
making an authentication decision based on said comparing step.

The method may comprise the additional steps of obtaining an image of said first pattern and applying a predetermined first indexing routine to said obtained image, for generating a first index of said first pattern, accessing said repository of said data records, and comparing said generated first index with content from said repository,
wherein said authentication decision is also based on said comparing of said generated first index with said content from said repository.

The method may furthermore comprise the additional steps of obtaining an image of said second pattern and applying a predetermined second indexing routine to said obtained image, for generating a second index of said second pattern, accessing said repository of said data records, and comparing said generated second index with content from said repository, wherein said authentication decision is also based on said comparing of said generated second index with said content from said repository.

In the present invention, the discrete elements of at least one of the first and second patterns are distributed randomly. In one embodiment, the discrete elements of one of the first and second patterns are distributed randomly, and the discrete elements of the other of the first and second pattern are distributed non-randomly. In another embodiment, the discrete elements of both the first and the second pattern are distributed randomly.

BRIEF DESCRIPTION OF FIGURES

FIGS. 24a to 24e show specific embodiments of a spectral overlap as schematically illustrated in FIG. 10. Herein, MAT1 and MAT2 are used as synonyms for INK1 and INK2, respectively.

DETAILED DESCRIPTION OF THE INVENTION

Figure 1A:
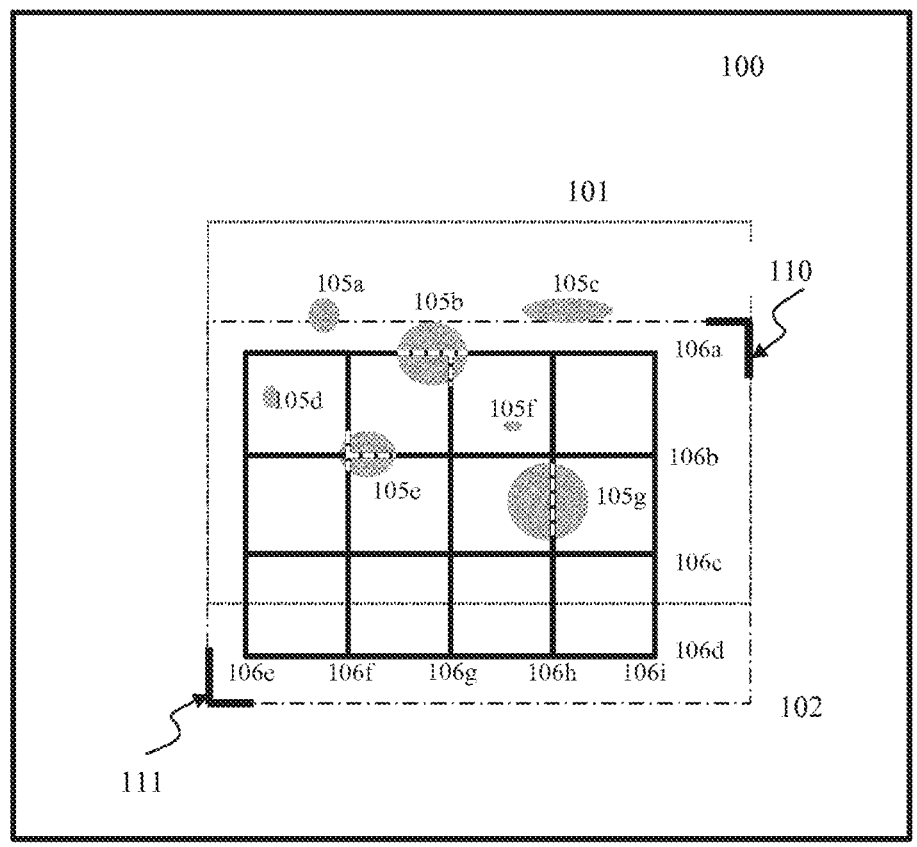
FIGS. 1a and 1b show an example of a security element according to an embodiment.

In the present application, the terms used in the specification are given their normal understanding in the art, unless specified otherwise. Irrespective of this, the following provides a list of definitions of the terms used in the present invention:

The term "comprising" is used open-endedly, and allows for the presence of further components that are not specifically recited. However, the term also encompasses the more restrictive meanings "consisting of" and "consisting essentially of", so that the term also encompasses the possibility that non-mandatory and not recited components are absent.

The term "at least" is used to denote that mandatorily not less than the recited amount is present. For instance, the term "at least two" requires the presence of two or more of the recited components, yet also allows for the possibility of further components. The term defines as such no upper limit, but often the amount of the recited species or elements is limited in practice, as well known to the skilled person. In many instances, a practicable upper limit is ten-fold the recited amount (e.g. twenty if "at least two" are recited), preferably five-fold, and more preferably twofold or threefold. However, a similar manner as outlined above for the term "comprising", the term "at least" also encompasses the possibility that no more than the recited amount is present, e.g. an amount of exactly two if "at least two" is recited.

Similarly, the term "x or more", such as "two or more", is used to denote that at least the recited amount is present, but the term also encompasses the possibility that more than the recited components are present. While in many cases the recited minimum amount will be sufficient, a higher amount or number may be preferable for certain applications. Again, the term per se does not define an upper limit, but often the amount of the recited species or elements is limited in practice, as well known to the skilled person. The term "one or more" preferably means one, two, three, four, five, six or seven, more preferably one, two, three, four or five, and even more preferably one, two or three, most preferably one or two, and the term "two or more" preferably means two, three, four, five, six or seven, more preferably two, three, four, or five, and even more preferably two or three.

The term "wavelength range", such as in the expressions "emission wavelength range" and "excitation wavelength range", generally denotes the range around a peak at a wavelength λmax in which excitation or emission, respectively, is observed. More precisely, it defines the area around a peak value λmax in a optionally normalized and background-subtracted spectrum, as measured on a transparent substrate such as a plastic (e.g. polyester) film or carrier, including the respective peak and the shoulders thereof up to the points where the line of the optionally normalized and background-subtracted spectrum crosses the baseline (i.e. the reading in the optionally normalized and background-subtracted spectrum where the observed value becomes zero). This range is centered around the respective peak λmax. A wavelength range may thus also be regarded as the breadth of the respective peak in an excitation or emission spectrum. As one example, if a given first dye exhibits a peak in an excitation spectrum at 450 nm, and breadth of this peak extends to wavelengths of 440 and 460 nm, respectively, the excitation wavelength range is from 440 to 460 nm.

The term "ink" shall encompass any composition that can be used for image or mark formation in an image forming or printing process. It includes water-based and organic solvent-based inks used for generally known printing processes, such as inkjet printing, offset printing, screen printing, lithographic printing, planographic printing or intaglio printing. In a preferred meaning, the term "ink" denotes a material that can be applied to a substrate by a spraying process and that retains on a substrate. The term ink thus also includes e.g. lacquer.

The term "pattern" is used to denote an assembly or arrangement of a multiplicity of discrete elements of identical composition. In the present invention, a pattern is formed on or in a suitable substrate.

The area occupied by a pattern (also referred to as pattern area) can be of regular form, such as a square, rectangle, triangle or circle, but can also be of irregular form without clear boundaries. The pattern area can be visibly restricted, such as by a solid line, but can also be unrestricted without clear outer boundaries. Preferably, the pattern area defines a regular form selected from rectangle, square, triangle, and indicia, such as logos, characters/letters and numbers.

The terms "randomly distributed" and "random distribution" denote a distribution of discrete elements that does not follow certain construction criteria or a certain scheme. Also, the distribution does not form a regular, repeating pattern. A random distribution of discrete elements is obtained from a random process for the formation of discrete elements on a substrate. One example of a random process for the formation of discrete elements is the spraying of an ink composition, leading to a random distribution of the ink stains (discrete elements) on the substrate. Another example of a random distribution of discrete elements is the random distribution of small particles in a paper substrate obtainable by adding a quantity of the particles to the bulk material forming the substrate during the papermaking process.

The term "discrete elements" is used to denote an entity that forms and defines a part of a pattern. An example of a discrete element is an ink stain obtained from a spraying process. Another example is a particle of certain material.

The outer shape of the discrete elements is not particularly limited, and can be regular or irregular. An example of a discrete element of regular form is an ink stain in the form of a disk or solid ellipse. Depending on the method of manufacture, the discrete elements will however typically have a slightly irregular form in that there is no perfect point or mirror symmetry present in a single discrete element. A discrete element may thus have any shape between a perfect symmetric shape and a fully irregular shape. Also, for instance in the case of an ink spray spatter, the discrete elements may be formed from single droplets of the ink, but may also be formed by multiple droplets forming partially overlapping stains, together forming a discrete element in the sense of the present invention.

The size of the discrete elements can be suitably chosen and is typically such that a discrete element can be easily detected by available detection technology. In view of the intended end purpose of the security element of the present invention and in consideration of the necessity of forming a pattern by a multiplicity of discrete elements in a relatively small area, the size of the discrete elements, expressed in term of their equivalent diameter determined by a microscopic method and as the number median value Dn50 of the discrete elements diameter distribution, is preferably small, such as 200 micrometer or less.

The term "visible range" means from 400 to 700 nm, "UV range" from 40 to less than 400 nm and "IR range" more than 700 nm to 2400 nm.

"Fluorescence" denotes the emission of electromagnetic radiation from an excited state of a material having a lifetime $\tau$ of less than $10^{-5}$ seconds in terms of exponential decay according to $$e^{-\frac{t}{\tau}},$$

where t denotes time in seconds.

"Phosphorescence" denotes the emission of electromagnetic radiation from an excited state of a material having a lifetime $\tau$ of $10^{-5}$ seconds or longer in terms of exponential decay according to $$e^{-\frac{t}{\tau}},$$

where t denotes time in seconds.

A partial spatial overlap is characterized by an area in or on a substrate wherein, when seen from an axis extending perpendicular to the plane of the substrate, there are at least three areas recognizable under certain viewing conditions: An area wherein discrete elements of the first pattern, but no discrete elements of the second pattern are provided, an area wherein discrete elements of the second pattern, but no discrete elements of the first pattern are provided, and an area wherein both discrete elements of the first pattern and discrete elements of the second pattern are provided (overlapping discrete elements). The certain viewing conditions may in some embodiments include only wavelengths of the visible range, but may in other embodiments also include or consist of wavelengths in the UV and/or IR range.

If, in the present description, an embodiment, feature, aspect or mode of the invention is stated to be preferred, it should be understood that it is preferred to combine the same with other preferred embodiments, features, aspects or modes of the invention, unless there are evident incompatibilities. The resulting combinations of preferred embodiments, features, aspects or modes are part of the disclosure of the present description.

The present invention also relates to a method for authenticating an article, and articles carrying a security element of the invention. The term "article" is to be understood in a broad sense and includes, but is not limited to, banknotes, value papers, identity documents, cards, tickets, labels, security foils, security threads, products of value, such as perfume, and product packages.

FIG. 1 shows a first embodiment of the present invention. A substrate 100 is provided, and comprises a first region 101 and a second region 102. The first and the second regions overlap at least partially. The two regions can also be identical, or one of the regions can enclose the other. In the first region 101, a plurality of discrete elements 105a to 105g is provided, which form a first pattern 105. In the example of FIG. 1 the discrete elements are shown as ink stains, but this is only a non-limiting example. The second region 102 contains a second pattern 106 formed by discrete elements 106a-106i. In the shown example the pattern 106 is a grid pattern of horizontal and vertical lines, but this is again only a non-limiting example.

A pattern in the meaning of the present description is an arrangement that is distinctive from its background, i.e. distinctive from the respective region of the substrate on or in which it is provided. As such, the discrete elements of the first pattern must not cover the entire first region of the substrate and the discrete elements of the second pattern must not cover the entire second region of the substrate, as in that case there would be no pattern. The coverage of the pattern expressed in terms of the ratio of covered area of the region to total area of the region is preferably less than 50%, more preferably less than 20%.

The discrete elements 105a-105g of the first pattern 105 are of a first material, for example an ink of a first composition applied to the substrate 100. The discrete elements 106a-106i of the second pattern are of a second material, for example an ink of a second composition applied to the substrate 100.

In accordance with the concept of the present invention, the discrete elements of at least one of the first and second patterns are distributed randomly. In the example of FIG. 1, the discrete elements of the first pattern 105 are shown as a random spatter pattern of ink stains. For example, such a random spatter pattern of ink stains can be generated with a spray nozzle and a nebulizer. The second pattern 106 in the shown example is a deterministic pattern, e.g. a regular pattern that can be applied by a printing process, such as inkjet printing. However, this is only one example, and the second pattern may also be provided in other ways, for example can also be a random pattern.

The term "random pattern" expresses that the pattern is generated by a process that comprises an aleatory characteristic so that a pattern is not systematically reproducible and the distributions of the discrete elements over the region of the substrate for individual applications of the generation process are random and uncorrelated, similar to the term random number, which expresses that a number is generated by a random process. Besides the formation of random spatter patterns by spraying ink droplets on a substrate, a random distribution of discrete elements can also be obtained by performing a random distribution of particles or fibres or threads when producing a substrate or a part of a substrate, e.g. distributing such particles in the polymer base of a plastic substrate (or a plastic layer of a composite substrate) while that base is not yet hardened or cured, or distributing particles in a paper substrate obtainable by adding a quantity of the particles to the bulk material forming the substrate during the papermaking process.

Figure 1B:
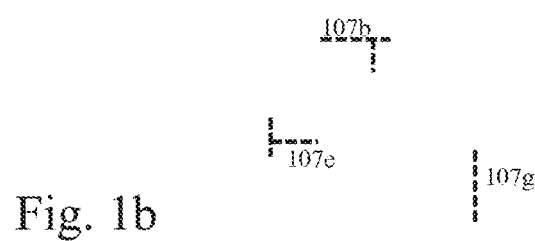

At least a part of the discrete elements of the first pattern 105 and at least a part of the discrete elements of the second pattern 106 are provided in such a way that they overlap. In other words, there are specific sections identifiable in the first and second region in which both discrete elements of the first pattern and discrete elements of the second pattern are present. For the specific example of FIG. 1, FIG. 1b shows an element 107b that corresponds to the overlap between discrete element 105b and discrete elements 106a and 106g, an element 107e that corresponds to the overlap between the discrete elements 105e and discrete elements 106b and 106f, and an element 107g that corresponds to the overlap between discrete element 105g and discrete element 106h. The elements 107b, 107c and 107g thus form a third pattern 107.

Figure 7:
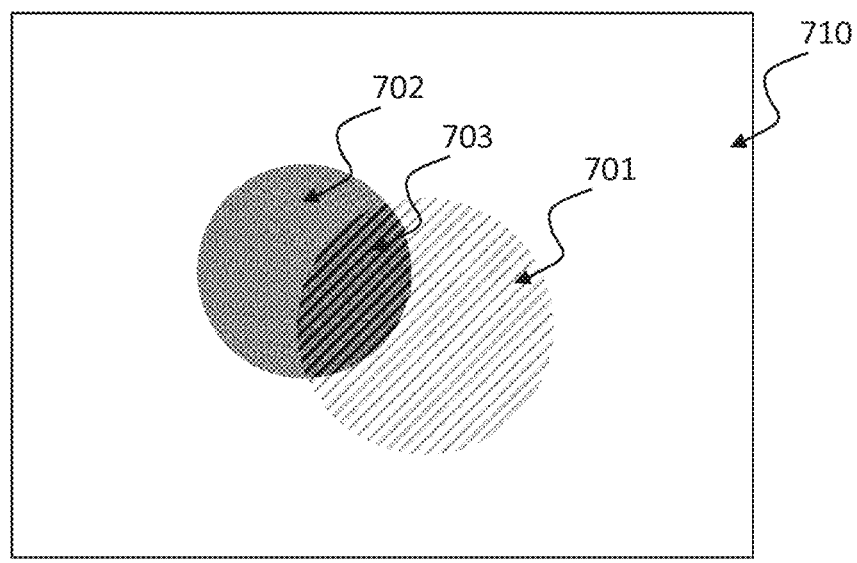
FIG. 7 shows another example of a security element according to an embodiment.

Another close-up example is shown in FIG. 7, where a first ink stain 701 and a second ink stain 702 are provided on a common region of a substrate 710. The overlap of the two ink stains 701 and 702 defines a section 703 that is an element in its own right, i.e. an element of the third pattern.

In accordance with the concept of the present invention, a security element is defined by the first pattern 105, the second pattern 106 and the third pattern 107 associated with the overlap of the discrete elements of the first and second patterns. Consequently, an authentication process using the security element of the invention may refer to the third pattern for confirming the authenticity of the element.

The first and second region may be implicitly defined by the presence of the first and second pattern, respectively. However, the respective areas may also be provided at predetermined locations on the substrate. These predetermined locations have the function of permitting a device for identifying the patterns to identify the regions, such that the first and/or second and/or third pattern can then be readily located. The locations can be indicated indirectly, e.g. as coordinates with respect to identifiable locations of the substrate, such as the corners 110, 111 shown in FIG. 1, or they can be indicated explicitly by appropriate markings that identify the first and second regions. For example, the dotted lines 101 and 102, which in the general context of the present invention are only for reference purposes and generally do not relate to a visible marking, could in such a special embodiment relate to visible elements that serve to identify the first and second region. Identifiable locations on the substrate may also be constituted by the edges or other angles of the object or document contour or boundaries.

The degree of overlap between the two patterns can be set in any suitable or desirable way. In general, it is desirable to provide third patterns that have a small coverage with respect to the overlap area of the first and second region of the substrate, because in this way the number of distinctive states provided by the different third patterns is large, so that the safety against counterfeiting is increased and the possibility of a collision (i.e. that two independently generated third patterns are by chance so similar that they lead to an identical index being generated in the ways described further on) is made small. This means that the coverage with discrete elements forming the third pattern 107b, 107e and 107g, i.e. the overlapping portions of discrete elements 105 of the first and the discrete elements 106 of the second pattern, is preferably small, such as 20% or less, preferably 10% or less, and further preferably 5% or less of the area defined by the overlap of the first region 101 and the second region 102 of the first and second pattern, respectively.

In order for the invention to work, a minimum number of elements of the first pattern should overlap with some elements of the second pattern in the Region Of Interest (ROI). The ROI is defined as the intersection of the first region where the first pattern is applied with the second region where the second pattern is applied. To obtain a minimum number of overlapped elements within the ROI, the probability of overlap should be higher than 90%, preferably higher than 95% and more preferably higher than 98%. To reach such a high probability, the ROI surface coverage, defined as the ratio of the area covered by discrete elements of the random pattern to the area of the ROI, should be higher than 2%, preferably higher than 5% and more preferentially higher than 20%. This applies to either one of both of the first and second pattern if both patterns are formed by randomly distributed discrete elements. In one embodiment, the corresponding degree of overlap of the discrete elements of the first pattern with the discrete elements of said second pattern is such that more than 10%, preferably more than 30%, more preferentially more than 50% of the discrete elements of the first pattern overlap with discrete elements of the second pattern. These percentage values refer to the number of discrete elements, not to the covered area.

The total coverage of the ROI by discrete elements of the first and second pattern is typically 50% or less, preferably 40% or less, and more preferably 20% or less.

The inventive security element provides the advantage of increased safety against forgery or counterfeiting. In a first aspect, the use of a pattern with random distribution of discrete elements is much harder to reproduce than a regular pattern, because there is no systematic process for regeneration of the random pattern, because the random pattern is arbitrary and there is no correlation between patterns produced at different instances. In a second aspect, the use of different materials for the discrete elements of the first pattern and the discrete elements of the second pattern provides a further layer of security, as a counterfeiter must analyse, obtain and be able to process the respective materials when attempting to produce a successful forgery. In a third aspect, the use of the third pattern for defining the security element provides a further layer of security, as a straight forward analysis of the security element at most shows the first and second patterns. Preferably, one or both of the first and second marking are invisible to the human eye under ordinary daylight or conventional room lighting, so recognizing the patterns is already a challenge for an uninitiated counterfeiter. However, even if the first and second pattern are recognized, there is no inherent indication that third pattern is being used for defining the security element. As a consequence, a forger will not be aware of the importance of the precise positional relationship of the first and second pattern, which defines the overlap and ultimately the third pattern, so that even if the first and second pattern are diligently reproduced, the precise positional relationship will probably not be, thereby allowing identification of the counterfeit based on the inventive use of the third pattern.

Expressed differently, the concept of the present invention allows adding a further degree of safety in a security element without having to apply an additional marking or pattern, as the third pattern is provided as the intersecting set of the first and second patterns.

Figure 2:
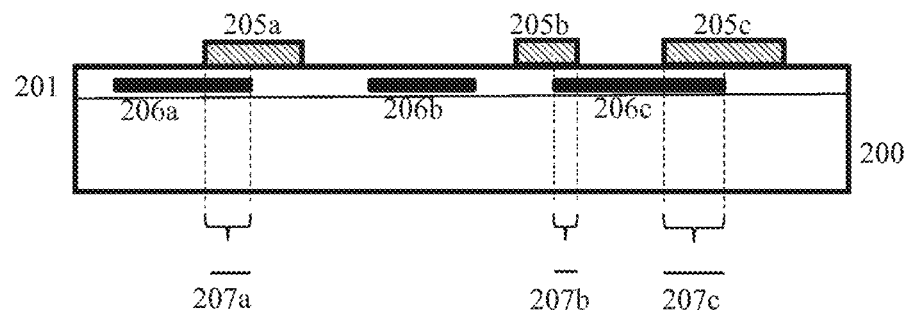
FIG. 2 shows an example of a side view of a security element according to an embodiment.

FIG. 2 shows a side view of an embodiment of a security element. The substrate 200 comprises a layer 201 in which discrete elements 206a-206c are provided. It is noted that the discrete elements 205 may be seen as corresponding to the discrete elements 105 of FIG. 1, and equally the discrete elements 206 of FIG. 2 can be seen as corresponding to the discrete elements 106 of FIG. 1. In the example of FIG. 2, the discrete elements 205 are provided on the surface of the substrate, while the discrete elements 206 are provided within the substrate beneath the surface. Naturally, this is only an example, and both discrete elements 205 and 206 can be provided on top of the surface, or both can be provided suitably within the substrate.

FIG. 2 schematically represents the areas of overlap 207a to 207c that result when viewing the substrate from a predefined angle, for example perpendicular to the surface area of the substrate.

Figure 3:
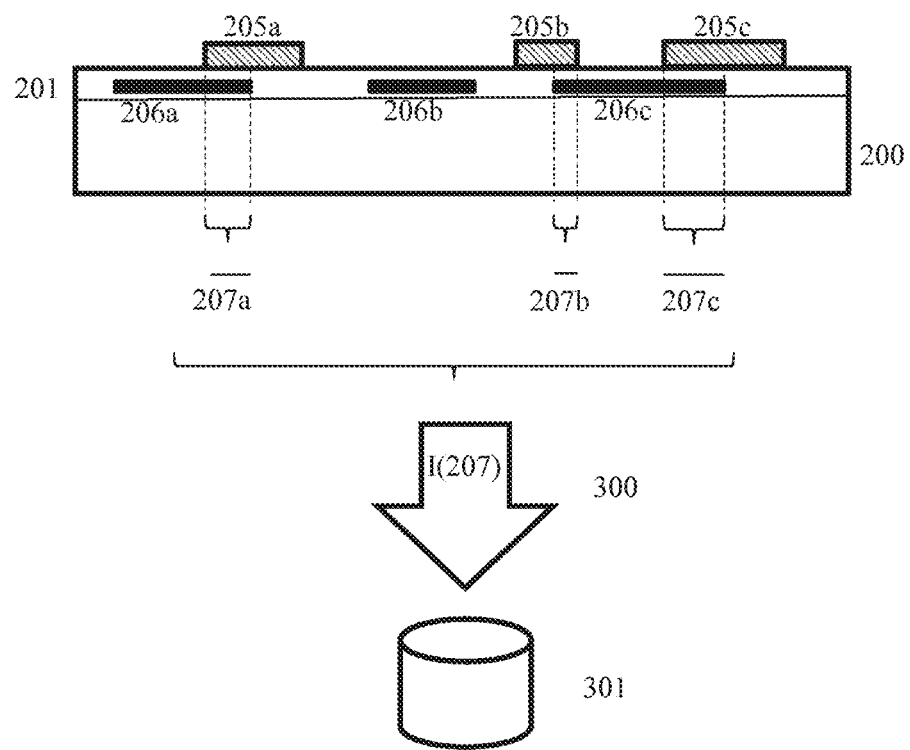
FIG. 3 shows an example of a schematic view of a security arrangement according to an embodiment.

FIG. 3 schematically shows an embodiment of the invention, in which a security element of the above kind is combined with a data record of an index for identifying the third pattern 107 or 207, in order to provide a security arrangement. More specifically, as indicated in FIG. 3, features of the third pattern 207 are evaluated by an indexing routine 300, in order to generate a data element I (207) associated with the third pattern 207 and arranged for identifying said third pattern. The stored index I (207) can then be used at a later time for authenticating the security element, as will be explained in more detail further on.

Figure 4:
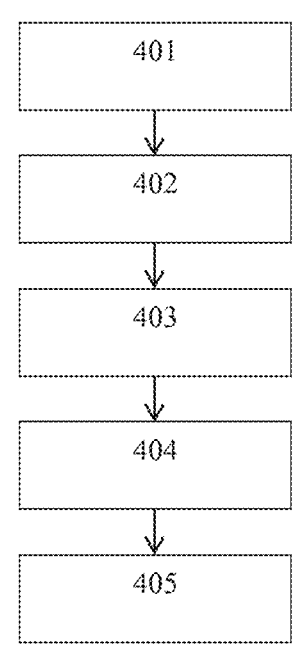
FIG. 4 shows an example of a method for producing a security arrangement.

FIG. 4 shows an embodiment of the present invention for producing a security arrangement as described above. In a first step 401 the first pattern is generated by distributing the discrete elements of the first material over the first region of the substrate. In step 402 the second pattern is formed by distributing discrete elements of the second material over the second region of the substrate. The discrete elements of at least one of the first and second patterns are distributed randomly. In one embodiment, the discrete elements of both the first pattern and of the second pattern are distributed randomly, e.g. by spraying ink droplets, while in another embodiment the discrete elements forming one of the first and second pattern are randomly distributed (e.g. by spraying ink) and the discrete elements forming the other pattern are distributed non-randomly, such as to form a logo, symbol, indicia or other graphical element.

It is to be noted that the order of steps 401 and 402 could also be reversed, or the two steps could also be performed in parallel. The first and second material are different from one another, such that it is possible to identify an area of overlap between the two patterns generated by the discrete elements of the first material and the discrete elements of the second material. In principle the two materials can be chosen in any suitable or desirable way to achieve this effect, for example can comprise different dyes and/or pigments, such that the optical characteristics are different under predetermined conditions and it becomes possible to distinguish the first pattern from the second pattern, but also to identify the area of overlap of the two patterns. For example, the two patterns can present respectively different colored responses when illuminated by electromagnetic radiation having a predetermined characteristic, and where the area of overlap provides a distinctive response distinguishable from that of the first or second pattern. A simple example of this is the first pattern presenting a first color under predetermined, e.g. standardized (in the meaning of CIE) illumination, the second pattern presenting a second, different color, and the area of overlap presenting a third color different from the first and second colors.

Returning to FIG. 4, the method further comprises a step 403 of obtaining an image of the third pattern followed by step 404 of applying a predetermined indexing routine to the obtained third pattern. Finally, in step 405 the generated index is stored in a data record. The data record is preferably part of a data repository dedicated to the storage of indices of third data patterns.

The step of obtaining an image of the third pattern can be done in any suitable or desirable way. For example, it may comprise illuminating the first and second region of the substrate with predetermined electromagnetic radiation and then performing an imaging with an imager suitable for capturing the specific spectral response of the overlap regions between the first and second pattern. In the above example, where the overlap regions display a specific color response with a third color, the step of obtaining an image of the third pattern may comprise performing an appropriate color filtering operation, which can for example be done by setting specific color filters in front of the lens of an imager, or can equally well be done by digital analysis of the image data produced by the imager, in order to appropriately identify pixels that fall into the desired color range associated with the third pattern.

Figure 16:
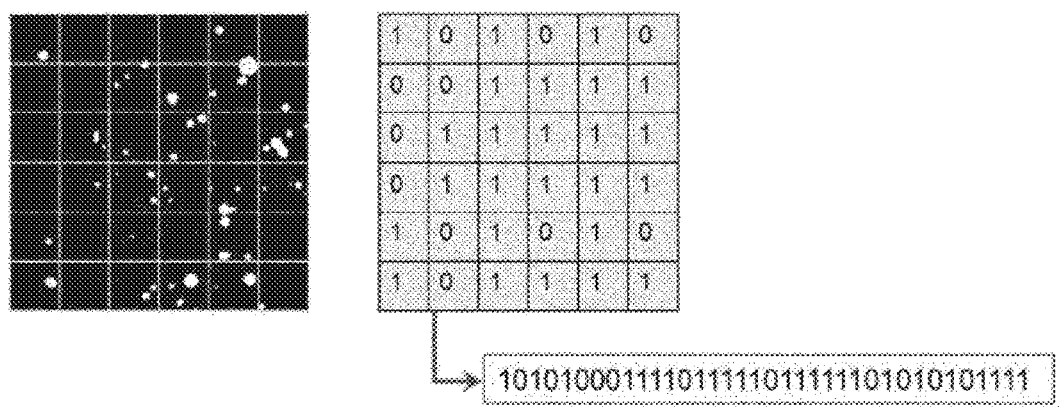
FIG. 16 shows an example of an indexing method.

An indexing routine within the meaning of the present description is any process that is able to derive a storable data element from the third pattern obtained in step 403. For example, the indexing operation can comprise taking the image data of the third pattern (i.e. a set of pixel coordinates and associated intensity values, e.g. color intensities on a scale of 0 to 255 in a three dimensional color space) obtained from an imager as is and then simply arranging this data in a predetermined format for storage. Preferably, the indexing operation allows a reduction in the amount of information to be stored, such that is not necessary to store the entire image information related to the third pattern. This can e.g. be done by using known pattern recognition techniques. Another technique that can be used is to define a grid of desired dimensions and to generate bit information in dependence on the presence or absence of an image element in that grid. FIG. 16 is an example of such a grid technique, where and area of overlap between the first and second substrate regions shown on the left hand side is analyzed using a N×N grid (N=6 in the example of the figure), and the different elements of the grid are assigned a value of 1 if a pattern element is present and a value of 0 if no pattern element is present, and subsequently the rows of the grid are simply concatenated to generate a bit string that can act as an index or signature associated with the pattern being indexed.

The step of storing the index in the data record can be performed in any suitable or desirable way, for example by registering the index in a suitable repository, such as a standard database. Preferably, the stored indexes are associated in the repository with further identifying elements of the object with which the security element is associated. More specifically, the security element can be associated with a commercial good, such as an item for sale (cigarette pack, beverage container, etc.), or can be associated with a value document, such as a currency note or other form of payment instrument. The commercial good or value document can itself constitute the substrate on or in which the security element is provided, or the substrate can be a label for attachment to the commercial good work value document. The commercial good or value document may have specific identifying elements, such as serial numbers, a Stock Keeping Unit (SKU) number or package IDs, which can appropriately be stored in association with the index of the third pattern.

Figure 5:
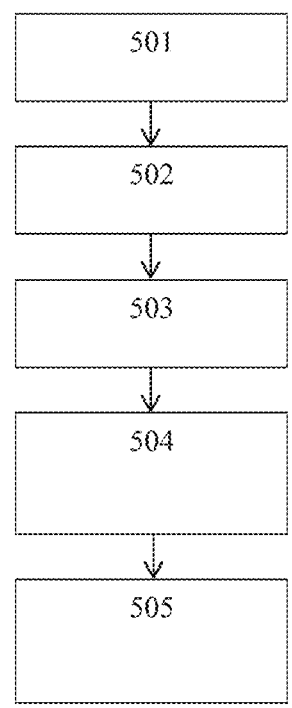
FIG. 5 shows an example of a method for authenticating a security element and a security arrangement.

FIG. 5 shows a further embodiment of the present invention. More specifically, it shows an example of a method for authenticating a security element and security arrangement of the above described kind. A situation is considered in which a commercial good or value document as described above is present. A user, for example an inspector, desires to determine whether or not the security element is authentic. In a first step 501 an image of the third pattern is obtained. The method of obtaining the image of the third pattern can be the same as described above in connection with the method of FIG. 4. Furthermore, an indexing routine 502 is applied to the obtained image, for generating an index of the third pattern. The indexing routine is preferably the same as that used in the method of FIG. 4 for generating the index to be stored. In step 503 a data repository of data records generated for third patterns as described above in connection with FIG. 4 is accessed. Then, in step 504 the generated index is compared with content from the repository, and in step 505 and genuineness decision is made based on the comparison.

The individual steps can be performed in any suitable or desirable way. Especially, the step 503 of accessing the repository of data records and the step 504 of comparing the generated index with content can be implemented in different ways, depending on for example how the repository is arranged.

In a first example, assuming that the repository only contains data records that comprise indices of third patterns, but does not associate the recorded indices with identification information of commercial goods or value documents, then the steps of accessing the repository and comparing the generated index can be implemented by comparing the generated index with some or all recorded indices, in order to determine whether the generated index matches one of the recorded indices. If a match is found, then the genuineness decision of step 505 results in a confirmation of genuineness. If no match is found, then step 505 results in a finding of "non-genuineness".

In a second example, assuming that the repository contains data records in which indices of third patterns are associated with identification information of items associated with the security elements, then the step 503 of accessing the repository of indices may comprise using an identification element obtained together with the third pattern, in order to find a specific record in the repository that is associated with the identification, in order to retrieve the index stored in association with that identification in the repository, and compare that retrieved index with the generated index. The genuineness decision of step 505 can then be such that genuineness is confirmed if the generated index and the retrieved index match, and that genuineness is denied in the event that the generated index and the retrieved index do not match.

Preferably, the method for authentication also takes into account one or both of the first pattern and the second pattern. In other words, the method is described in connection with FIG. 5 can be complemented by the step of obtaining an image of the first pattern and applying a predetermined indexing routine associated with the first pattern to the obtained image, for generating a corresponding first index of that first pattern then the repository of data records can be accessed for comparing the generated first index with content from that repository, similar to what was described above with respect to the third pattern. The authentication decision can then also be based on comparing the generated first index with the content from the repository. As a complement or alternative to additionally taking the first pattern into account, the method of FIG. 5 can also be amended by obtaining an image of the second pattern and applying a predetermined indexing routine associated with the second pattern to the obtained image, for generating a second index associated with the second pattern. Then the repository of data records can be accessed for comparing the generated second index with content from the repository, in order to base the authentication decision also on the comparison of the generated second index with content from the repository.

Figure 6:
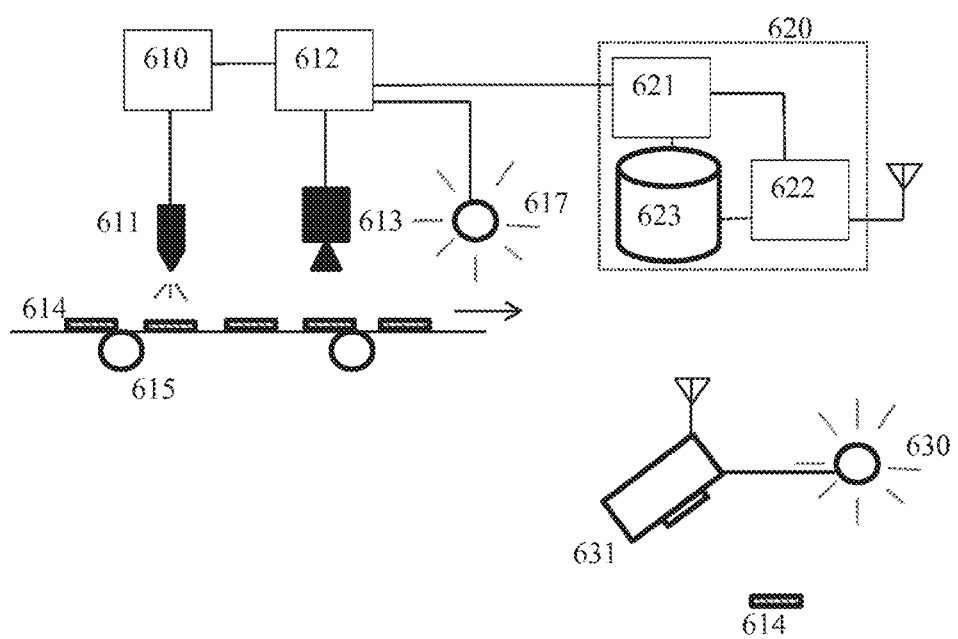
FIG. 6 shows embodiments of the invention in a system configuration relating to the generation of an inventive security element and security arrangement, and to the authentication of such a security element.

FIG. 6 shows embodiments of the invention in a system configuration relating to the generation of an inventive security element and security arrangement, and to the authentication of such a security element.

Reference numeral 615 schematically indicates a production or packaging facility, in which items 614 are prepared. Examples of such items can be the above mentioned commercial goods or value documents. At the facility 615 a system 610, 611 is provided for applying patterns to the items 614 by appropriately distributing the respective discrete elements, and a system 612, 613 is provided for imaging the applied patterns. For example, 611 may be a combination of an ink jet printer for applying a regular pattern and a spray nozzle for applying a random ink spatter pattern, under the control of a control module 610. Device 613 may be a digital camera suitable to capture an image of the first and second patterns, from which an image of the third pattern associated with the overlap of the discrete elements of the first and second patterns generated by system 610, 611 can be obtained, under the illumination with electromagnetic radiation suitably provided by an illumination element 617, where devices 613 and 617 operate under control of a control module 612. However, as an alternative or in complement to being able to capture images of the first and second patterns, device 613 may also be arranged and controllable in such a way that the image of the third pattern is captured directly based on the particular response of the third pattern to the irradiated illumination. Thus, obtaining an image of the third pattern may be done by direct image capture and/or indirectly by processing images of the first and second patterns. The control modules 610, 612 can be provided in any suitable or desirable way in the form of hardware, software or a combination of hardware and software. Preferably, the control modules are provided as programmable computer devices, where both modules 610 and 612 may be provided separately, but can also be embodied by a single computer unit.

The system of FIG. 6 also has a data repository 620, which is arranged such that it can communicate at least with the control element 612 at the facility 615. The repository 620 is preferably at a location remote from the facility 615, but facility 615 and repository 620 can also be at the same location. A control module 621 connected to a storage unit 623 can exchange data with the control module 612, in order to perform the above described operations of storing an index of a third pattern in a data record. The connection can be by any suitable or desirable communication method, e.g. wire-bound or wireless, via dedicated channels or via a general purpose communication network, such as a telephone network or computer interconnection network. According to an embodiment, the communication comprises using the Internet.

Referring to the above described method embodiment of FIG. 4, steps 401, 402 can be performed by system 610, 611, whereas steps 403, 404 can be performed by system 612, 613, 617, and step 405 can be performed by module 621. However, it is noted that the images of the first and second patterns captured by device 613 can also be processed by module 621 at the data repository, in order to obtain the third pattern and subsequently generate the index for storage.

The example of FIG. 6 furthermore schematically shows an inspection device 631 designed for performing steps in a method of authenticating a security element and security arrangement of the above described kind. The inspection device is preferably a mobile device, more preferably a portable hand-held device, e.g. an appropriately programmed mobile telephone. In the example, an item 614 is illuminated by a source 630 of suitable electromagnetic radiation for identifying the third pattern. Inspection device 631 comprises an imager suitable to capture an image of the first and second patterns, from which an image of the third pattern associated with the overlap of the discrete elements of the first and second patterns can be obtained, and/or can be arranged and controllable in such a way that the image of the third pattern is captured directly based on the particular response of the third pattern to the irradiated illumination.

The data repository 620 comprises a communication module 622 that can communicate appropriately with the inspection device 631. The communication can be by any suitable or desirable method, e.g. wire-bound or wireless, via dedicated channels or via a general purpose communication network, such as a telephone network or computer interconnection network. According to the shown example, the communication involves a wireless connection using antennas, e.g. through a mobile telephone system.

Referring to the above described method embodiment of FIG. 5, step 501 can be performed in inspection device 631, but also can be performed by control module 621 in the data repository 620. The same applies for step 502. The access step 503 can be performed by control module 621, while steps 504 and 505 can again be performed in the control module 621 and/or in the inspection device 631. According to a preferred embodiment, the inspection device 631 captures under respectively suitable illumination images of the first and second regions of the substrate, sends this information to the data repository 620, and all of steps 501 to 505 are performed by control module 621, in order to give back the authentication result of the authentication decision to the inspection device 631, which can appropriately notify a user of the inspection device, e.g. via information on a display of device 631. This embodiment has the advantage of keeping the structure of the inspection device simple in terms of the authentication functionality, as most authentication processing is done at the repository 620, and the security of the authentication processing is enhanced, as none of the components for performing the processing are accessible outside of the repository.

The control module 621 can be provided in any suitable or desirable way in the form of hardware, software or a combination of hardware and software. Preferably, the control module is provided as one or a set of programmable computer devices, especially as a server accessible over a network, that comprises a database engine for managing the data records held in the storage device 623, and with further processing modules for performing one or more of the processing steps described above in connection with FIGS. 4 and 5.

The present invention can also be embodied as software code parts designed to enable the above described methods when loaded into and executed in a control system or control module. The invention can also be embodied as a data carrier holding such software code parts.

Now further embodiments and aspects of the present invention will be described.

The first and second material can be chosen in any suitable or desirable way. For example, the first material may comprise one or both of a first dye and a first pigment, and the second material may comprise one or both of a second dye and a second pigment. Preferably, one or more of the dyes and pigments present in the first and second materials is luminescent, i.e. displays one or both of fluorescence and phosphorescence. This provides an added level of safety against counterfeiting, because the authentication may be based not only on the appearance of the patterns, but also on the specific spectral characteristics of the luminescent material or materials, i.e. the specific excitation and emission wavelength ranges that are characteristic of the luminescence of the material.

According to a further embodiment, the security element may be provided in such a way that the discrete elements of at least one of the first and second patterns are not visually distinguishable from the background, i.e. the substrate. In other words, the respective pattern is designed to be invisible for a human observer under conventional conditions, e.g. when looking at the security element under daylight or normal room white lighting using only the naked eye. This increases the safety against forgery and counterfeiting, as a counterfeiter cannot readily see the pattern, which only appears under special conditions, e.g. when illuminated within a particular wavelength range that leads to a predetermined spectral response, e.g. a luminescent response.

The determination of visual distinguishability can be done in any suitable or desirable way. For example, it can be determined that a pattern is not visually distinguishable when the contrast of the pattern to the background (i.e. the substrate) is below a predetermined threshold. Contrast can be measured in any suitable or desirable way, e.g. as the ratio of the luminance difference between pattern and background and the average luminance of both pattern and background, or as the ratio of the luminance difference between pattern and background and the luminance of the background. The contrast can also be defined with respect to color, i.e. as color contrast, e.g. using the chrominance in place of the luminance, or a contrast measure can be used that takes both color and luminance into account. The threshold can be set to 5%, preferably to 2% and most preferably to 1%. Observation can also be measured in any suitable or desirable way, e.g. by simple visual inspection by a human observer or also using any predetermined standard observer. Illumination can be chosen in any suitable or desirable way, e.g. an incandescent tungsten lamp or similar lighting system, or sunlight can be used. It is also possible to use any suitable standard illuminant. A standard illuminant can be chosen in any suitable or desirable way, and e.g. be a CIE Standard Illuminant A, B, C or D. A standard observer can equally be chosen in any suitable or desirable way, and e.g. be a CIE 1931 2° Standard Observer or a CIE 1964 10° Standard Observer.

In particular, the security element may be provided such that the discrete elements of one of the first pattern and the second pattern do not provide a contrast with respect to the substrate that is visually perceivable, and the discrete elements of the other of the first pattern and the second pattern provide a contrast with respect to the substrate that is visually perceivable. In other words, one of the first and second patterns is invisible while the other is visible. This enhances the security, as it increases the tendency that a counterfeiter will concentrate on the visible pattern and miss the invisible pattern, which in turn significantly lowers the probability that a counterfeiter will correctly reproduce the invisible pattern not only in terms of material and appearance, but also in correct spatial relationship to the visible pattern. As a consequence, the risk of a counterfeiter reproducing the third pattern is lowered.

In other words, such an arrangement comprising a first pattern formed by distributed discrete elements of a first material that is visible by the naked eye under conventional lighting (a "perceivable pattern"), and a second pattern formed by distributed discrete elements of a second material that is not visible by the naked eye under the same viewing conditions (a "non-perceivable pattern"), provides a combination of an overt and a covert security feature. If as described in an embodiment of the invention the non-perceivable pattern is provided on an area overlapping with the area in which the perceivable pattern is provided, it is possible to create a unique security element that, in a first aspect, is product-specific and can be checked and authenticated by inexpensive and easily available image processing equipment for the visible pattern, and that, in a second aspect, can be verified for its authenticity, production pathway and origin using more sophisticated technology. For instance, taking the above example of a turbine blade of a jet engine, a first visible pattern, e.g. a spray pattern obtained using red ink, may be provided by the manufacturer of the turbine material, to thereby authenticate the origin and quality of the turbine material. A second (invisible) pattern, e.g. a spray pattern obtained from a clear, colorless ink containing a fluorescent dye, which is provided on or overlapping with the region in which the first visible pattern is provided, may then authenticate the site of manufacture. By the combination of two patterns, e.g. by the pattern formed by the areas of (partial) overlap of the discrete elements forming the visible and invisible pattern, respectively, a unique security element is formed that simultaneously confirms the origin of the material as well as its proper manufacture, wherein the latter can only be checked by someone having knowledge of the invisible pattern (and having access to a database containing information provided by the invisible pattern). The entire production pathway can then further be verified by someone having access to the database in which information extractable only from the combined patterns (e.g. the areas of overlap of discrete elements of different patterns) is stored.

Random Spray Spatter (Patterns)

Figure 17:
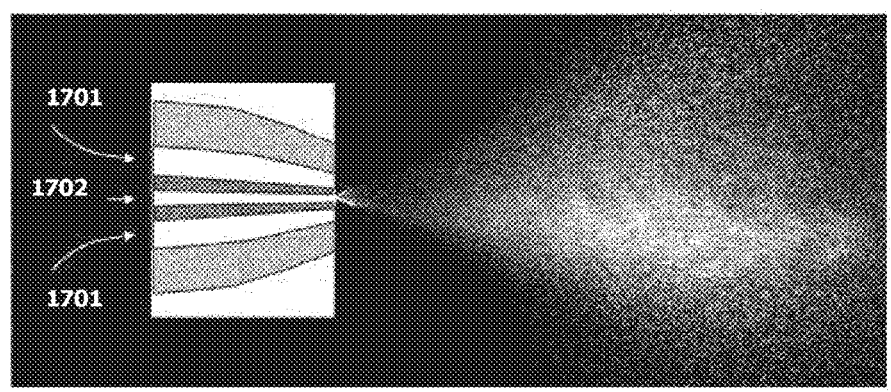
FIG. 17 schematically illustrates a simplified working principle of a concentric nebulizer.

According to an embodiment, the security element is provided such that the randomly distributed discrete elements are obtainable by spraying ink, in order to generate a random spatter pattern of ink stains. This can be done in any suitable or desirable way. For example, a suitable spray nozzle configuration, which offers flexibility and a wide parameter space of operation, in particular for scarce sprays, is a concentric nebulizer. A simplified working principle of such a device is illustrated in FIG. 17, which shows a cross-section diagram of a concentric nebulizer spray head, and can be described as follows:

Liquid (e.g. ink) 1702 is fed into a central capillary by a dosing valve;

Gas (e.g. air) 1701 flows co-axially around the capillary and detaches the liquid meniscus at the tip end by drag force and/or by Venturi effect (at higher gas flow speed);

The gas flow nebulizes the liquid;

The gas flow carries the nebulized droplets downstream.

An example of a suitable spraying device is the commercially sold Nordson MicroSpray EFD787-MS spraying device, which may be operated in pulsed mode. The pulse mode allows for very small volumes of liquid per spray mark, fast paces (up to 30 Hz) and a broad range of variable nebulization gas flows.

Figure 18:
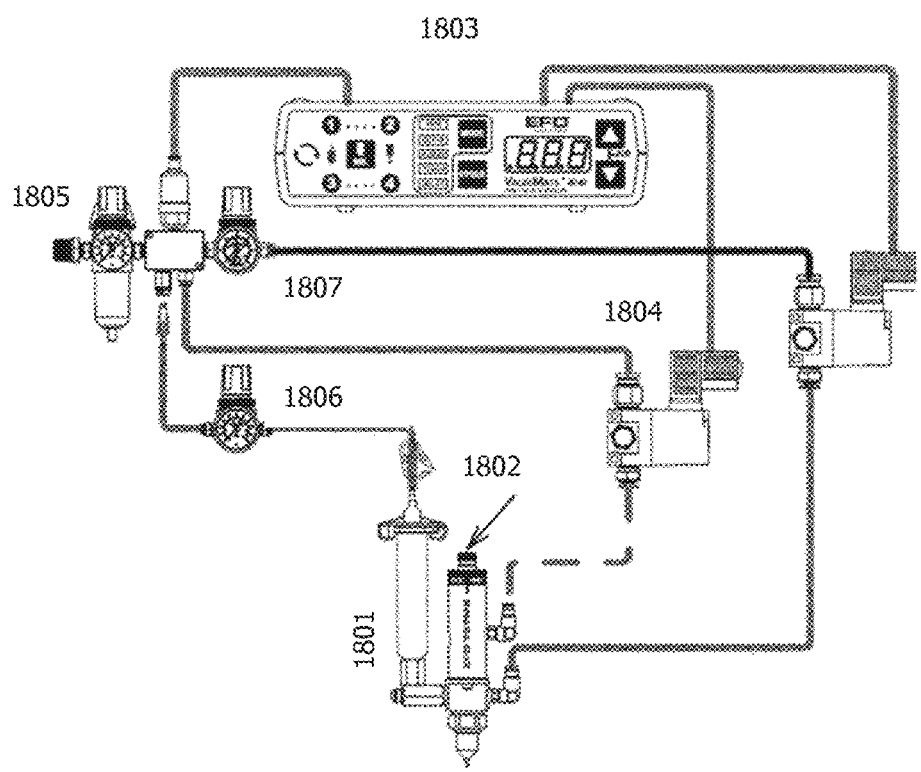
FIG. 18 schematically illustrates an example of a microspray system.
Figure 19:
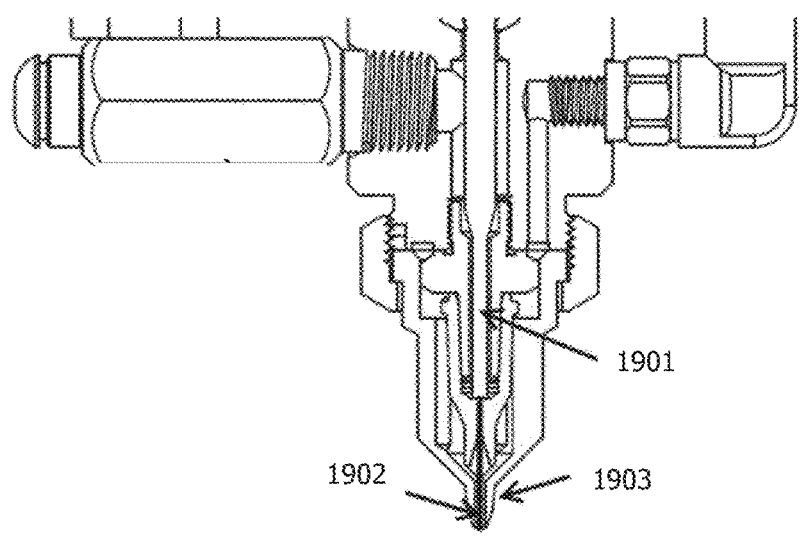
FIG. 19 schematically illustrates details of a microspray system.

More details of a microspray system are represented in FIG. 18 and FIG. 19. It is composed of the microspray head, the liquid reservoir 1801, a controller 1803 and various pressure reducers, valves and gas pipes. The inlet circuit pressure may be 6 bars, which is also the actuating pressure of the valve 1804 ($p_{valve}$ 1805). The reservoir is pressurized with $p_{res}$ 1806 (typically 1 bar) in order for the liquid to be pushed into the capillary 1902 when the valve is opened. $p_{res}$ has a minor influence on the spray spatter features, but can be adjusted according to liquid viscosity, e.g. can be increased as the liquid viscosity increases, in order to preserve identical liquid volumes per spray puff at different viscosities.

Other spray parameters of interest may be the valve piston 1901 stroke, which is related to the liquid throughput during the valve opening time ($\Delta T$), and the nebulizing gas flow ($Q_{neb}$). The latter is determined by the nebulizing gas pressure 1807 ($p_{neb}$) and the nozzle conductance. The nozzle conductance is directly related to the annular cross-section between the outer (capillary) needle 1902 diameter and the nozzle 1903 cap hole diameter (see FIG. 19). The piston stroke can e.g. be adjusted using a rotating knob 1802 with a scale. The creation of diffuse spray spatters is preferably done using very small liquid volumes per puff. Consequently, the valve stroke may be set close to its minimum value.

The inner diameter of the dispenser needle may be chosen in accordance with ink viscosity. For inks of viscosity with typical values of 1 to 10 cp (centipoise—mPa·s), an inner diameter range of 150-200 µm is adequate. This diameter may be increased for higher viscosity fluids. The needle length may be ½ inch (12.7 mm), which makes the tip slightly crop out of the nozzle end. The outer needle diameter may be 400 µm and the inner nozzle diameter may be 0.9 mm, which leaves an annular cross-section of 0.5 mm$^2$ for the nebulizing gas. This gap may be varied for adjusting the atomization degree and the spray mist aerodynamics towards the substrate (nebulization and velocity) for a given gas flow, in order to generate patterns of a desired kind. A needle centering ring can also be used to enforce coaxial geometry, resulting in an axially-symmetrical spray spot. The nebulization gas may flow continuously, whereas the liquid may be pulsed.

At a gas pressure of 1 PSI (pound per square inch), the nebulization gas flow was estimated to be 2 to 3 l/min, which corresponds roughly to a local gas velocity at the nozzle exit of 8-12 m/s. The Reynolds number (Re) can be estimated by taking into account the hydraulic diameter of the annular nozzle exit. It may be in the range 800-1200, which is characteristic of laminar flows. The laminar flow results in a coarser nebulization when compared to the standard operation of a spray device with 10 times more velocity and a Re number in the turbulent regime.

TABLE 1

| Parameter | Symbol | Unit | Range | Preferred value |
|---|---|---|---|---|
| Dispenser needle Gauge | G | G | 32-23 | 27 (transparent colour code) |
| Inner needle diameter | D | μm | 100-330 | 200 |
| Outer needle diameter | D | μm | 230-640 | 400 |
| Valve stroke | S | Knob scale | 0-2.5 | 0.1 |
| Inlet/valve pressure | $p_{valve}$ | bar | 5-7 | 6 |
| Reservoir pressure | $P_{res}$ | bar | 0-6 | 1 |
| Nebuliser gas pressure | $P_{neb}$ | PSI (bar) | 0-30 (0-2) | 3 (0.21) |
| Spray puff time | ΔT | ms | 10-10'000 | 20 |
| Spray distance | L | mm | 30-100 | 60 |

Table 1 shows an example of spray working parameters with their ranges and preferred values for obtaining a suitable spray spatter that produces a random pattern in accordance with the present invention. The distance (L) from the spray nozzle exit to the substrate is also a parameter. The larger the distance, the broader and the more diffuse the spray spatter will be. Since nebulization also occurs during the flight of the spray mist, a larger distance leads to smaller droplet mean size. However, under Table 1 conditions, this effect is observable only at a short spray distance (L<20 mm), which is inadequate due to the spatial non-uniformity of the spray spatter and too large droplet mean size. A suitable choice for L is between 30-60 mm for a spray spot diameter of 15-30 mm.

Substrate

The security element of the present invention comprises at least two patterns formed by distributed discrete elements in or on a substrate. The substrate for this purpose is mainly determined by the end use of the security element. If the security element shall be used on e.g. a banknote, it is self-evident that then the substrate may be the banknote substrate made mostly from paper, but in other instances plastics can be used, or hybrid materials in which plastics and paper are combined.

It is further self-evident to the skilled person that the substrate and the material forming the randomly distributed discrete elements thereon or therein may be chosen such as to be compatible with each other, so that the presence, and in particular the position and/or size of the discrete elements forming the pattern, can be inspected for authentication purposes. For example, the randomly distributed discrete elements may be formed by spraying two different ink compositions to thereby form two patterns, and in this case the substrate may be a substrate on which an ink can be maintained and fixed, such as paper or cardboard. In this case, the pattern (i.e. the position and size of the randomly distributed discrete elements) can be inspected by conventional image processing equipment, as the pattern is easily visible.

In one embodiment of the invention, the randomly distributed discrete elements are present in the substrate. This can for instance be achieved by blending particles, which represent the discrete particles forming a pattern, into the bulk of the substrate during the manufacture thereof. For instance, a small amount of two different UV-fluorescent particles can be included into the pulp for the papermaking process, and patterns formed by the randomly distributed two kinds of particles can then be observed by illuminating the substrate including the UV-fluorescent particles with UV light and measuring the emission positions and/or intensities resulting from the randomly distributed particles.

A similar effect can be obtained by mixing different materials (e.g. having different color) into a translucent or transparent plastic raw material prior to formation of a plastic substrate for e.g. a credit card. Again, the distribution pattern of the different particles can be used for authenticating a security element.

A further possibility of including particles (as an example of discrete elements) in a substrate is the use of detectable particles of different color in an adhesive that is used for the formation of clear adhesive labels having translucent or transparent plastic layer. Herein, two or more patterns can be formed by randomly distributed particles of two or more kinds, which are present in an adhesive layer that is glued to a material to be authenticated (e.g. a cardboard box containing high-value shoes). The adhesive layer is then preferably of such a kind that a part of the adhesive containing the particles of different kinds remains on the material to be authenticated, e.g. by using an adhesive having low cohesive properties, or to which some of the material (e.g. the top paper layer of a cardboard box) remains attached. In such manner, authenticating labels that can be produced simply can be provided to a manufacturer, and these labels cannot be detached from the authentic product without destroying the label.

As already extensively described, the pattern could also be formed by randomly distributed discrete elements that are provided on the substrate. This can be achieved by providing the discrete elements forming the pattern in such a way on the substrate that a random and not predetermined distribution is achieved. Preferably, in this case the random distribution of the discrete elements is achieved by a random application process, such as spraying. Spraying allows achieving a random distribution of ink stains on the substrate, each of the ink stains forming a discrete element that is part of a pattern of ink stains.

Of course, it is also possible to use a combination of randomly distributed discrete elements within the substrate, forming a first pattern, and randomly distributed discrete elements on the substrate, forming a second pattern.

Discrete Elements Forming a Pattern

The discrete elements forming a pattern are not particularly limited, as long as they can be detected by available detection technology.

One preferred example are ink stains formed from two or more of different ink compositions (formed from droplets of ink that are provided by a random process on the substrate, such as by spraying), that form distinguishable discrete elements having certain detectable intrinsic (e.g. color, luminescence, reflection) and extrinsic (position relative to an orientation mark on the substrate, size, shape) properties. The ink stains may be circular, but may also have an irregular shape as produced by overlaps between ink droplets or by substrate irregularities or roughness.

Alternatively or additionally, the discrete elements may be provided in the substrate. In principle, any particulate material that is conceivable after its incorporation can be used for this purpose. Suitable materials include pigments and metal particles.

Pattern Regions

The area of a pattern, which corresponds to the above described first and second region of the substrate, is generally defined by the randomly distributed discrete elements, so that the entire area in which the respective kind of randomly distributed discrete elements are present is to be considered as the pattern area. In the case of an inclusion of particles into the substrate by addition of the particles during the production process, to thereby form randomly distributed discrete elements within the substrate, e.g. by addition of fluorescent pigments to the papermaking pulp, the entire substrate forms the pattern area. If the randomly distributed discrete elements are formed by ink droplets distributed randomly by a spraying process, the entire area in which the stains are present on the substrate form the respective pattern area.

It is immediately evident that the two or more patterns employed in the present invention therefore define two or more pattern regions, i.e. one for each pattern. The pattern regions of the two or more patterns overlap at least partially to allow the utilization of the relative information between the discrete elements of the different patterns and to allow generating the third pattern that is associated with the overlap of the discrete elements of the first and second pattern. One example for such a preferred embodiment is the provision of two patterns formed by spraying two inks, e.g. a yellow ink and a cyan ink, to thereby form patterns of randomly distributed discrete elements (ink stains), in the same or overlapping areas. In such a case, typically some of the stains of a first pattern will overlap with stains of a second pattern, and the area of overlap of the randomly distributed discrete elements forms a third pattern (e.g. in green due to the combination of cyan and yellow by color subtraction) that can be used for authentication purposes.

In a preferred embodiment, the pattern areas defined by the randomly distributed discrete elements of the two or more patterns overlap by at least 50%, and more preferably by at least 75%. In a further preferred embodiment, the pattern areas (e.g. the substrate regions 101, 102) defined by all randomly distributed discrete elements of all patterns are identical.

The pattern area of one of the two or more patterns, of two of the two or more patterns or of all of the two or more patterns (in case of more than two patterns) may be restricted by an outer marking, such as a line. It may be preferable to provide such a marking or line in order to provide a basis for the assessment of the information encoded by the random distribution (e.g. the position of a specific discrete element relative to a crossing or corner of the line restricting the pattern area). The outer marking may take any form, e.g. the form of a simple rectangular box, but may also take the form of indicia, logo, numbers or characters.

The size of the pattern area is not particularly limited, but is preferably large enough to allow proper detection. As one example, the pattern area is 0.1 $cm^2$ or greater.

Overlay of Patterns

An example of two patterns each having discrete elements formed from different materials is for instance a first spray pattern formed from discrete elements of a first colour (e.g. yellow), and a second spray pattern formed from a different colour (e.g. cyan).

An advantage of the present invention, which uses two or more of patterns made from different materials, is that a further level of information can be added, not only including the size and position of the discrete elements (stains) of one pattern, but also including information on the kind of material (e.g. the color of the discrete element). An additional level of information can then be provided not only by the kind of material forming the discrete elements of one of the two or more patterns, but also by the nature of the surroundings.

In the concept of the invention as applied to the above example, it is not only possible to attribute a first set of information to the position, size and/or shape of the yellow stains (discrete elements) forming a first one of the at least two patterns, but to attribute a second set of information to the position, size and/or shape of the cyan stains (discrete elements) forming a second one of the two or more patterns. By virtue of the third pattern, a third set of information is attributed to the relative arrangement between discrete elements of the first and second pattern. Also, the relative amount of the discrete elements may provide even further information that could be analyzed e.g. by the spectral response under certain viewing conditions, representing certain relative amounts of cyan and yellow stains.

Hence, the presence of a second pattern formed by discrete elements and the definition of a security element by the third pattern not merely adds information provided by the second pattern per se, but also allows defining certain relationships between the elements of the first and second pattern, which also represents encodable information. The presence of a second pattern formed by distributed discrete elements made from a different material therefore not only doubles the amount of encodable information, but multiplies it. This provides a higher level of security against counterfeiting, and is extremely difficult to reproduce.

In an embodiment of the invention, discrete elements of different patterns are formed in different colors, so that in the area of overlap a color impression different from the color impression provided by each of the discrete elements per se is obtained. In such a case, the areas of overlap and their arrangement can be detected and used for authentication purposes in the form of the third pattern. As one example, if some of the stains (discrete elements) of a spray pattern of cyan ink and some of the stains (discrete elements) of a spray pattern of yellow ink overlap, the color impression in the areas of overlap will neither be cyan nor yellow, but will be green. Correspondingly, the distribution, position, color and/or shape of the areas of overlap provide a third pattern of randomly distributed discrete elements.

Embodiments Utilizing an Energy Transfer (Cascade Effect)

As outlined above, in a preferred embodiment of the present invention, the materials forming the randomly distributed discrete elements of different patterns are able to interact with each other in a specific way in the area of overlap of discrete elements of different patterns. One example given above is the combination of cyan and yellow discrete elements formed from an ink spray pattern, which provides a green impression in the area of overlap.

Figure 10:
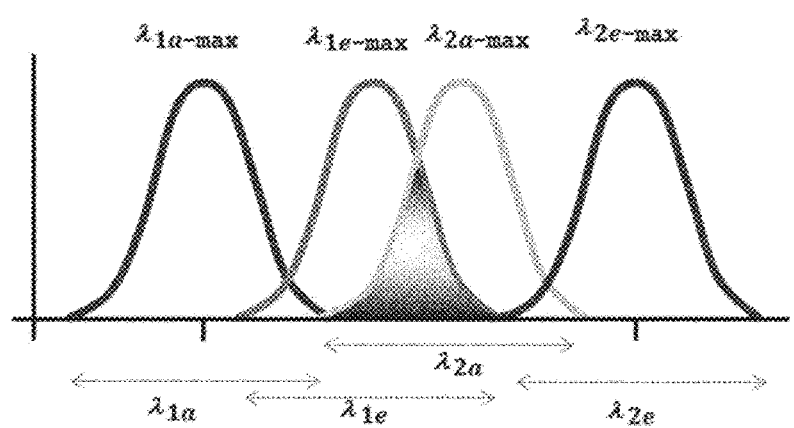
FIG. 10 schematically illustrates the wavelength relationships between two dyes or pigments that can interact energetically.

In a further preferred embodiment, the materials used in the preparation of different patterns can interact with each other in a specific way, namely by providing a so-called "cascade effect" of two dyes present in the formulations for producing the respective patterns. That is, in a preferred embodiment, the present invention provides a security element wherein the discrete elements forming a first one of the two or more patterns are formed from a first ink INK1 comprising a first dye or pigment DYE1, and the discrete elements forming a second one of the two or more patterns are formed from another INK2 comprising a second dye or pigment DYE2, wherein a part of the discrete elements forming the first pattern overlap with a part of the discrete elements forming the second pattern, and wherein dye or pigment DYE1 contained in INK1 is a fluorescent dye or pigment, which upon excitation by electromagnetic radiation falling within an excitation wavelength range λ1a of the first fluorescent dye or pigment DYE1 is capable of emitting electromagnetic radiation in at least one first emission wavelength range λ1e, and the second dye or pigment DYE2 contained in INK2 is a fluorescent dye or pigment, which upon excitation by electromagnetic radiation falling within an excitation wavelength range λ2a of the second fluorescent dye DYE2 is capable of emitting electromagnetic radiation in at least one second emission wavelength range λ2e, wherein said first emission wavelength range λ1e of the first fluorescent dye or pigment DYE1 contained in INK1 overlaps with the excitation wavelength range λ2a of the second fluorescent dye or pigment DYE2 contained in INK2, so that upon irradiation with electromagnetic radiation within the excitation wavelength range λ1a of DYE1, DYE2 is excited, in the area of overlap of the discrete elements, to emit electromagnetic radiation in the emission wavelength range λ2e. This embodiment will in the following also be referred to as the "cascade embodiment". The respective wavelength ranges are illustrated in FIG. 10.

Regarding the cascade effect, we also refer to co-pending application EP 14 184 924.0, which was filed by the same applicant and which is incorporated by reference.

By a suitable selection of the dyes and/or pigments in INK1 and INK2, it is possible to obtain emission within the wavelength range λ2e by irradiating the security element with exciting radiation in the wavelength range λ1a in the regions of overlap of the discrete elements forming the respective patterns. The cascade effect is then only observed in the area of overlap. If the fluorescent dyes are chosen such that λ2e is outside the visible range, a covert security feature is formed by the pattern formed by the overlapping areas of the discrete elements forming the respective patterns. Additionally or alternatively, λ1a is chosen to be in the UV region, such as around 355 or 378 µm, so that the cascade effect is not observed under essentially UV-free viewing conditions, such as under irradiation with an incandescent lamp. In this case, the cascade effect is observed more clearly if a UV lamp emitting at the respective wavelength is used for illumination/detecting the third pattern.

That is, by employing a combination of fluorescent dyes wherein the emission of the first fluorescent dye is capable of exciting the second fluorescent dye, one can obtain the emission of the second fluorescent dye by merely exciting the first fluorescent dye, e.g. by irradiating the ink with electromagnetic radiation in a wavelength region at which excitation of the first fluorescent dye occurs, and it is not necessary to irradiate the ink with radiation capable of exciting the second fluorescent dye in order to obtain the second dye's emission. If the proportion of the second dye or pigment DYE2 (also referred to as acceptor), or the application amount of the respective INK2 is significantly larger than that of the first dye or pigment DYE 1 (also referred to as donor), the spectrum observed in the overlap regions upon excitation of the donor will be dominated by the emission of the acceptor, with minor portions stemming from the emission of the donor that is not utilized for excitation of the acceptor.

In this case, it is a decisive advantage of this embodiment that a counterfeiter will be unable to detect, by analysis of the emission spectra of the ink mark, that two dyes or inks are present in the area of overlap, because he will mainly (or exclusively) measure the emission of the second dye (acceptor), since the emission of the donor mainly excites the acceptor. The emission of the donor may thus not be detectable at all in the area of overlap, or may be rather weak, depending on the relative amounts of donor and acceptor.

A counterfeiter's analysis of the patterns, and in particular a clear assessment regarding the areas of overlap of the discrete elements formed from INK1 and INK2 is rendered more difficult by the fact that relatively small amounts of donor dye, e.g. 5 to 10% based on the total weight of acceptor and donor dye in the respective areas of overlap, may in some cases suffice to produce the cascade effect. Such a ratio can be adjusted by the concentrations of the dyes in the inks, for instance.

One further unique feature of this embodiment of the invention is that the authenticating method can be used to observe the (possibly averaged) emission intensity response as tailored by the cascade effect (i.e. depending on the choice and ratios of donor and acceptor) but also by the specific illumination (i.e. the specific shape of the excitation spectrum, e.g. intensity of radiation as a function of wavelength, which can for example be adjusted by varying the specific illumination intensities of sources of radiation that emit different wavelengths) used to generate the response, and thus the signature generated in the areas of overlap of the discrete elements.

Therefore, the response, i.e. the observed emission, will be very sensitive to precise compositions of the inks, which makes it more difficult to reproduce, leading to a spectrum signature that provides a high reliability of authentication. Indeed, the emission spectrum, observed over a spectral range that is not necessarily large but identical for all the acquired images does not substantially vary in shape, but varies in intensity level as the ratio of donor and acceptor is modified. As a consequence, a counterfeiter is forced to reproduce very precisely the compositions of the inks in order to generate an acceptable signature in response to the specific illumination. Moreover, the inks' intensity responses strongly depend on the dry ink material layer thickness, which requires to reproduce precisely the overall ink formulation (not only the dye or pigment concentration) and to apply the inks with nearly the same process. This represents an additional hurdle for a counterfeiter.

It is one particular advantage of the present invention that the spectral response (also referred to as spectral signature) not only depends on the energy transfer from the donor to the acceptor (the cascade effect), but also on the excitation wavelengths used. Using the same fluorescent dyes producing the same cascade effect, but with different excitation wavelengths, will change the observed spectral response (signature). The preparation of very precise mixture compositions hence can produce distinctive signatures that should only be reproducible at the same excitations and for the same mixture ratios, as obtained by certain ink concentrations and coating thicknesses of the inks. As a counterfeiter generally has no knowledge about the excitation wavelength(s) used for authenticating, it is of utmost difficulty for him to mimic the signature obtained by using the ink of the present invention by using a combination of dyes that lead to a similar spectral response when excited within a broad wavelength range. Rather, the counterfeiter would need to know which exact excitation conditions (such as a combination of different excitation wavelengths in a certain intensity relationship) are used for authentication, and would then need to adapt the spectral response so as to mimic the signature of the ink of the present invention.

Therefore, the excitation and emission patterns can be made complex enough to carry a significant and discriminant ink feature, and therefore, one can exploit these properties by imaging the areas of overlap of the discrete elements formed from INK1 and INK2 with excitation light at different wavelengths.

Therefore, a problem solved by such an embodiment of this invention is that it allows for a more robust authentication of luminescent marks than methods that simply image a broader spectral range. Embodiments of the invention, which use an excitation spectrum approach, can achieve these aims in a more compact and affordable way than other techniques based on spectral emission analysis. In addition, embodiments of the present invention also address the desire for tailoring the ink signature to certain requirements of a user of the ink by using a combination of two specific fluorescent dyes.

These and other advantages of embodiments of the present invention over the prior art can be summarized as follows:

- The cascade effect described above allows generating a unique excitation and/or emission spectrum signature for an enhanced discrimination. The tailoring of the inks allows quickly changing ink properties, addressing the case of an ink that is copied and that requires a quick action to cure the problem. Ideally, the authenticating device hardware does not need to be changed, as the change in ink properties can be taken into account by simply updating the authentication criterion, i.e. whether a measured response from a mark under examination shows the behavior expected of an authentic make. This updating of the authentication of the criterion can be achieved by a simple software update in a programmable authentication device.
- The emission spectra of commercial markers are often publicly available. Therefore, counterfeiters may combine several dyes and/or pigments to mimic a certain signature. However, excitation spectra are less straightforward to obtain, and therefore it poses a more complex problem for a counterfeiter to select and combine known markers such that a spectrum deemed authentic is obtained for a selected (predetermined) excitation radiation.
- Embodiments of the present invention are compatible with laser illumination (quasi-monochromatic excitation) for more detailed signatures and higher discrimination capability.
- The authentication method of an embodiment of the invention is also more suitable for handheld devices (e.g. smartphone-based systems), where movable parts or bulky components, which would be required for spectral emission analysis, represent a drawback.
- In accordance with an embodiment of the invention, it is more economical and technically simpler to do a form of excitation analysis (e.g. with multi LED illumination or with multi-laser illumination) with an imaging device than complex emission analysis by hyperspectral imaging techniques (Fabry-Perot method; Custom Bayer; AOTF; tunable band pass, etc.).
- Embodiments of the present invention are also easier to implement in authentication systems that detect luminescence, since a modification of sensors to produce multispectral emission imaging is not required.
- In addition, the spectral signature to be regarded as genuine may rely on relative calculations (e.g. intensity ratios or correlations for different excitations). This approach prevents problems posed by differing ink concentration or by ink aging.
- The authentication method of the invention can also be advantageously applied not only to dot matrix codes or others, but also on some fine printed designs like logos or images where security ink is printed on small areas hardly accessible with other methods.

In accordance with the invention, the spectral signature of a genuine ink mark formed by the areas of overlap of the patterns formed from INK1 and INK2 depends on the excitation wavelength(s) used and the ink properties. Therefore, for a counterfeiter to forge the ink, he needs not only to know the ink spectral emission properties as a function of the excitation wavelength but also the excitation wavelengths used to generate the signature, which requires reverse engineering the device used. This also means that a given ink can have different signatures if different excitation wavelengths are used. Further, the security of the solution can be enhanced by prescribing the use of several excitation wavelengths for authentication, thus increasing the complexity of the signature to match.

The cascade effect is illustrated in FIG. 10, where $\lambda_{1a}$ is an excitation range of INK1, $\lambda_{1e}$ is an emission range of INK1. $\lambda_{2a}$ is an excitation range of INK2, $\lambda_{2e}$ is an emission range of INK2. $\lambda_{1a\text{-}max}$ is a peak maximum of excitation of INK1, $\lambda_{1e\text{-}max}$ is a peak maximum of emission of INK1, $\lambda_{2a\text{-}max}$ is a peak maximum of excitation of INK2, and $\lambda_{2e\text{-}max}$ is a peak maximum of emission of INK2. As shown in FIG. 1, the degree of overlap of the light emitted by the donor within the excitation wavelength range of the acceptor (and the intensity) are chosen to be sufficient to excite the acceptor to emit electromagnetic radiation. Therefore, the term "said first emission wavelength range λ1e of the first fluorescent dye or pigment DYE1 overlaps with the excitation wavelength range λ2a of the second fluorescent dye or pigment DYE2" denotes that there is an overlap in the respective spectral ranges in the emission wavelength range of the fluorescent dye or pigment DYE1 present in INK1 (donor) and the excitation wavelength range of the fluorescent dye or pigment DYE2 present in INK2 (acceptor). Taking the example of a fluorescent dye DYE 1 (donor) having a first excitation wavelength range λ1e of 440 to 460 nm, a spectral overlap is given if an excitation wavelength range of the fluorescent dye DYE2 (acceptor) in INK2, i.e. λ2a, includes the values of 440 nm or 460 nm, respectively.

As one example, an overlap is given if λ1e of the donor is from 440 to 460 nm, and λ2a of the acceptor is from 450 to 470 nm. A spectral overlap in the sense of the present invention is, however, not given if merely the end values of the ranges are the same, such as in the case of λ1c=440 to 460 nm and λ2a=460 to 480 nm.

According to the above definition, a small overlap in the respective ranges λ1e and λ2a suffices, as also then a cascade effect in the sense of the present invention occurs. The occurrence of the cascade effect is, however, the more pronounced the more there is a degree of overlap between an emission wavelength range λ1e of the donor and an excitation wavelength range λ2a of the acceptor. In preferred embodiments of the present invention, the "wavelength range" can be taken in a narrower fashion, in order to ensure a stronger degree of overlap between λ1e and λ2a. Accordingly, the term "wavelength range" preferably denotes the span of wavelength values, in a normalized and background-subtracted emission or excitation spectrum, up to and including the wavelengths where the line of the normalized and background-subtracted peak falls to a value of n % (0<x≤100) of the peak value at the wavelength λmax, e.g. 10%, more preferably 25%, further more preferably 50% of the peak value at the wavelength λmax. Due to such a narrower "wavelength range", which includes only spectrum values larger than n % (such as 10%, 25% or 50%) of the spectrum amplitude at the maximum, the requirement of an overlap between the (narrower) wavelength ranges leads to a greater overlap between the entire emission spectrum of the donor and the entire excitation spectrum of the acceptor.

Considerations for choice of materials as donor and acceptor to obtain a sufficient "spectral energy transfer" allowing a cascade effect can also be expressed as follows. The spectral energy transfer ratio SE of the cascade effect can be defined as the percentage of area under the normalized (i.e. divided by the maximum spectral amplitude) excitation spectrum of the acceptor $A2(\lambda)$ that also falls under the normalized emission spectrum of the donor $E1(\lambda)$.

Figure 24C:
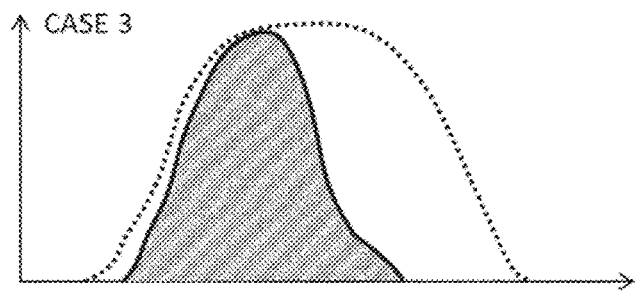

According to a preferred example, the excitation spectral range of the acceptor fully falls within the emission spectral range of the donor (CASE1, see FIG. 24a). In other words, 100% of the excitation spectrum of the acceptor is included/comprised inside the emission spectrum of the donor, and the above defined spectral energy transfer ratio is 100%. Note that the donor is contained in MAT1 and that the acceptor is contained in MAT2.

Even more preferably, compared to the situation represented in FIG. 24a, the emission spectrum of the donor could exactly match the excitation spectrum of the acceptor so that the whole emission energy of the donor can potentially be transferred to the acceptor. However this situation can rarely be achieved because only a few combinations of materials (pigments and dyes) can satisfy it.

However, other choices of materials are also possible. For example CASE 2 in FIG. 24b where a fraction of, but not the entire, excitation spectrum of the acceptor falls within the emission spectrum of the donor. In this example, the dashed area under $A2(\lambda)$ that also falls under $E1(\lambda)$ represents 50% of the total area under $A2(\lambda)$, such that SE is 50%. Preferably, SE should be larger than 50%, and more preferably larger than 70%.

In CASE 2 according to FIG. 24b, a fraction of the acceptors cannot be excited by the donor because no or little photons are emitted by the donor in a part of the excitation wavelength range of the acceptor. In addition, a fraction of the emission of the donor cannot be used to excite the acceptor because it falls within wavelengths that are outside of the excitation spectrum of the acceptor.

An alternative case (CASE 3 in FIG. 24c) can be envisioned where also 50% of the area under $A2(\lambda)$ is overlapped by the emission spectrum $E1(\lambda)$ of the donor, but the whole emission spectrum $E1(\lambda)$ is enclosed within $A2(\lambda)$. In this case, all the emitted energy by the donor can potentially be transferred to the acceptor.

Figure 24D:
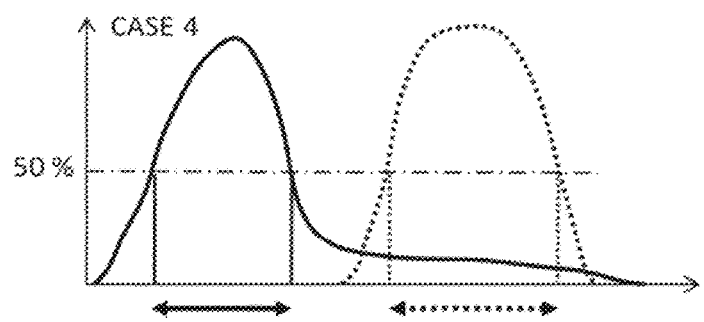

There are, however, other cases possible, such as CASE 4 illustrated as an example in FIG. 24d. Here, although the excitation spectral range of the acceptor is completely overlapped by the donor emission spectrum, the spectral energy transfer ratio would be rather low because the emission spectrum intensity is very low in the region of overlap.

As a consequence, and as described above, the requirement of overlapping spectral ranges can be chosen such that both spectral ranges may only include spectrum values larger than n % of the spectrum amplitude at the maximum (e.g. 50% in FIG. 24d). Then a condition for the spectral energy transfer ratio to be sufficient could be expressed in terms of the ratio of wavelength range where an overlap occurs, to the excitation spectral range (as defined above) of the acceptor. Preferably this ratio is 50% or more, more preferably 70% or more and most preferably 100%.

Figure 24E:
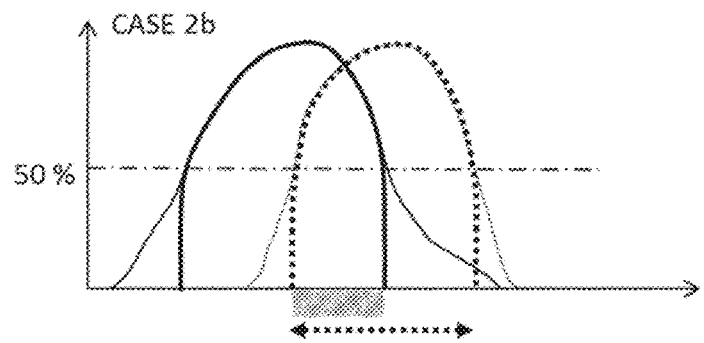

FIG. 24e shows CASE 2b which is an alternative representation of CASE 2 of FIG. 24b (same spectra), but using the criterion defined in terms of wavelength ranges for intensity exceeding 50% of maximum. In this example, the ratio of spectral range overlap to the excitation spectral range of the acceptor is about 50%, which is the same as the criterion using the area of FIG. 24b.

Note that in FIG. 24, MAT1 and MAT2 denote INK1 and INK2, respectively, wherein the excitation and emission spectra are determined as described later.

It is preferred that the first fluorescent dye DYE1 displays an excitation peak in its excitation spectrum at a wavelength ($\lambda$1a-max) that is shorter than the wavelength ($\lambda$2a-max) at which the second fluorescent dye DYE2 displays an excitation peak in its excitation spectrum, i.e. that $\lambda$1a-max (nm)<$\lambda$2a-max (nm).

It is also preferred, in this and other embodiments of the invention, that the first fluorescent dye DYE1 displays a maximum emission in its emission spectrum at a wavelength ($\lambda$1e-max) that is shorter than the wavelength ($\lambda$2e-max) at which the second fluorescent dye displays a maximum emission in its excitation spectrum, i.e. that $\lambda$1e-max (nm) <$\lambda$2e-max (nm).

It is further preferred that $\lambda$1a-max<$\lambda$1e-max<$\lambda$2a-max<$\lambda$2e-max, as illustrated in FIG. 10. This is however not mandatory, as an overlap between $\lambda$1e and $\lambda$2a can also be realized if $\lambda$1e-max>$\lambda$2a-max. Accordingly, in one embodiment of the present invention $\lambda$1a-max<$\lambda$2a-max<$\lambda$1e-max<$\lambda$2e-max Typically, the emission peak wavelengths of the first and second dyes are located at longer wavelengths than their respective excitation peak wavelengths, i.e. $\lambda$2a-max<$\lambda$2e-max and $\lambda$1a-max<$\lambda$1e-max. In this case, the emission occurs at longer wavelengths (at lower energy) as compared to the respective excitation. It is however also possible to use, as a first fluorescent dye (donor), so-called anti-Stokes fluorescent dye in the present invention, where the emission occurs at shorter wavelengths as compared to the respective excitation, i.e. $\lambda$1a-max>$\lambda$1e-max. In such an embodiment, $\lambda$2a-max may be at shorter or longer wavelengths as compared to $\lambda$1e-max.

The difference between the two excitation peaks of the first (donor) and second (acceptor) fluorescent dye, respectively, i.e. ($\lambda$2a-max)−($\lambda$1a-max), is for instance at least 5 nm, e.g. 5 to 500 nm, 10 to 200 nm, 20 to 80 nm, 30 to 70 nm, and preferably 50 to 200 nm. A difference of at least 20 nm is preferred in order to avoid excitation of the acceptor dye by the irradiation of the electromagnetic radiation that is intended to excite donor dye in an authentication method.

The absolute difference between the emission peak $\lambda$1e-max of the donor dye and the excitation peak of the acceptor dye $\lambda$2a-max, i.e. ABS(($\lambda$2a-max)−($\lambda$1c-max)) is for instance at most 20 nm. A smaller difference is preferable, since then a greater overlap between $\lambda$2a and $\lambda$1e can be ensured.

Due to possible interactions between the dyes, a potential overlap in the respective peaks and ranges, and potential consequent difficulties in the spectral analysis, the measurements are performed separately for each dye.

The wavelength at which a dye displays a peak in the excitation spectrum ($\lambda$a-max) or emission spectrum ($\lambda$e-max), and the respective excitation and emission wavelength ranges are measured as follows.

Notably, in the present invention all measurements are performed at room temperature (20° C.), and consequently the peak wavelengths $\lambda$1a-max, $\lambda$1e-max, $\lambda$2a-max, and $\lambda$2e-max as well as the respective ranges $\lambda$1a, $\lambda$1e, $\lambda$2a, and $\lambda$2e are those measured at room temperature according to the following procedure:

First of all, a blank is prepared, which is ensured to be formulated such as not to interfere with the fluorescence of the donor and acceptor dyes, both chemically and optically. A composition that was found to serve this purpose well is composed of 87 wt.-% Methylethylketone, 10.3 wt.-% of a hydroxyl-containing copolymer made from 84 wt.-% vinyl chloride and 16 wt.-% of acrylic acid ester (commercially available from Wacker Chemie under the tradename VINNOL E15/40 A) and 2% of a terpolymer made from 84 wt.-% vinyl chloride, 15 wt.-% vinyl acetate and, 1 wt.-% dicarboxylic acid (commercially available from Wacker Chemic under the tradename VINNOL E15/45 M). While this system is preferably used for the present invention, also other systems can be employed as long as it is ensured that there is no or very little interference with the fluorescence of the donor and acceptor dyes, both chemically and optically.

Then, two separate inks INK1 and INK2 are prepared by dissolving 1.23 wt.-% of the respective dye in the above blank. These inks are used for determining the wavelength peaks and the wavelength ranges for both emission and excitation, separately for each dye/ink.

Samples having 12 µm wet film deposit thickness are then prepared, using e.g. a K Control Coater from RK Print Coat Instruments, for all mixtures, i.e. the two inks and the blank using a coating bar, e.g. the HC2 coating bar, on a suitable white substrate (e.g. the white part of LENETA N2C-2 substrates), followed by drying at room temperature. Then, all drawdown samples are measured in emission and excitation mode using a commercial Horiba Fluorolog III (FL-22) as further described below.

Horiba Fluorolog III Measurement Conditions:

The instrument used to perform emission and excitation spectra measurement is a commercial twice double monochromator equipped with a continuous Xe arc lamp as illumination source and a Hamamatsu R928P photomultiplier tube operated in photon counting mode as detector. The flat sample is positioned so that its normal direction is at an angle of 30 degrees with respect to the irradiation optical axis. The Fluorolog-III type of light collection method used is "Front Face". In this collection mode, the emission collection is performed at an angle of 22.5 degrees with respect to the irradiation beam. By using this collection method and setup, it is ensured that collecting direct specular reflection from the sample is avoided. Both excitation and emission monochromators are double monochromators fitted with 1200 grid/mm holographic gratings blazed at 500 nm.

Figure 11:
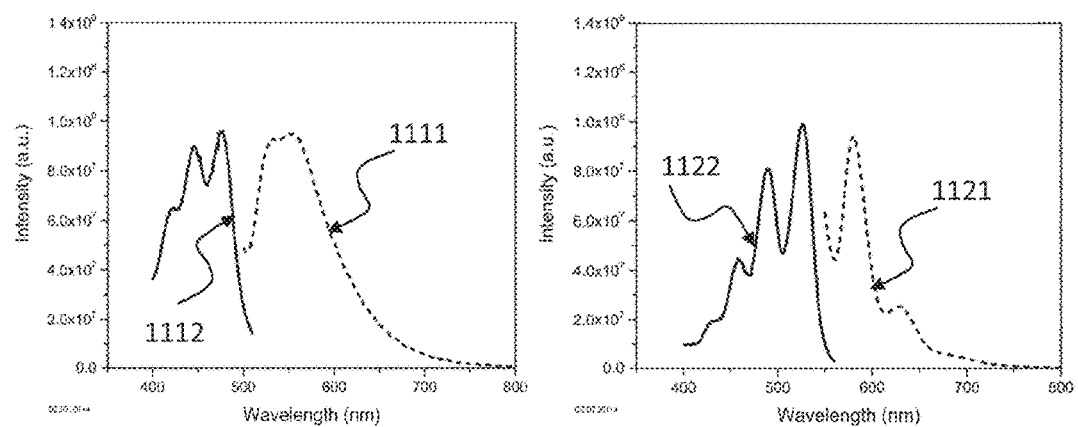
FIG. 11 shows luminescence emission and excitation spectra for two example dyes.

For excitation spectrum measurement, as shown for instance in the curves on the left of both plots of FIG. 11, the following procedure is adopted: the emission monochromator is set at a given wavelength (the one where the emission is to be measured, for example 530 nm in FIG. 1, left graph) and the excitation monochromator is scanned at 1 nm increment, over the wavelength range where the excitation spectrum is to be measured (e.g. 400 to 510 nm). At each excitation wavelength increment, a measurement of the emission signal is recorded by the detector using a 100 ms integration time. As known to the skilled person, since the irradiation source is not spectrally flat, a suitable irradiation correction is applied onto the measured signal at every wavelength using an appropriate spectral calibration. A spectral correction of the detector sensitivity is also applied. The spectrally corrected excitation spectrum can hence be reconstructed.

For emission spectrum measurement, the excitation monochromator is set to the desired excitation wavelength (e.g. at 480 nm for the left curve of the left plot of FIG. 11) and the emission monochromator is scanned over the desired emission spectral range (500 to 800 nm for the right curve of the left graph of FIG. 11, for example) at 1 nm increment while recording the detector signal at each wavelength with a 100 ms integration time. The emission spectrum is then constructed from all recorded data points after having applied the suitable spectral sensitivity corrections of the instrument.

The spectral calibration of the Fluorolog III excitation channel is performed using a procedure that is commonly applied by persons skilled in the art: the spectral irradiance is measured using a calibrated detector (e.g. a reference photodiode) positioned at the location of the sample. This is performed for all wavelengths by scanning the excitation monochromators. This reference detector has a known spectral response (sensitivity as a function of the wavelength of radiation impinging on it) previously determined by measuring an irradiation standard (e.g. a calibrated tungsten ribbon lamp) in a laboratory. An excitation spectral calibration curve is then calculated by dividing the real spectral sensitivity of the used reference detector by the measured spectral irradiance. This calibration curve can then be used to correct the spectral response to excitation of subsequent measurements by simple multiplication.

The spectral sensitivity calibration of the emission measurement channel of the Fluorolog III is performed in an analogue way by using a spectral irradiance standard (e.g. a tungsten ribbon lamp, whose spectral irradiance has been determined in a laboratory). This lamp is disposed at the location of the sample and spectral emission is recorded by the Fluorolog 111 detector during the scanning of the emission monochromators. An emission spectral sensitivity curve is obtained by dividing the spectral irradiance curve of the standard irradiance source by the measured spectral curve. Subsequent measurements are then corrected by multiplication by the spectral emission calibration curve.

These calibration procedures are repeated regularly to ensure correction of any instrument drift or detector/Xe lamp ageing. The overall spectral resolution of the instrument for both emission and excitation measurements is 0.54 nm FWHM (Full Width at Half Maximum), for the slits configuration used in the measurement conditions described above.

The same above procedure is applied for the different sample measurements, only the spectral ranges for the excitation and emission spectrum measurements, along with the excitation and emission fixed wavelengths, may differ depending on the dye compositions of the samples.

As derivable from the above, since the measurements shall serve to evaluate the spectral properties of the final ink print, the donor or the acceptor dye is dissolved in a blank composition at a concentration of 1.23 wt.-%. Then, emission and excitation spectra are recorded separately for each ink under the same conditions as for the blank. For each ink, the background is subtracted and the spectrum optionally normalized (with the highest peak having an intensity of 1.0), and the peak wavelength(s) λmax and the emission and excitation wavelength ranges λ1a, λ1e, λ2a and λ2e are determined by measuring the points where the spectrum returns to baseline (or to 10, 25 or 50% above baseline, depending on the definition of the term "wavelength range" as discussed above).

These measurements thus provide the wavelength ranges λ1a, λ1e, λ2a and λ2e and the respective wavelengths of the peaks λ1a-max, λ1e-max λ2a-max and λ2e-max: these are then used to determine whether or not the requirements of the present invention are satisfied. These measurements can also be used to identify suitable dyes as acceptor and donor dyes for the purposes of this embodiment of the present invention.

In the above explanations, it was assumed that each dye exhibits only one excitation peak ($\lambda$1a-max, $\lambda$2a-max) and one emission peak ($\lambda$1e-max, $\lambda$2e-max), and only one corresponding excitation wavelength range ($\lambda$1a, $\lambda$2a) and one emission wavelength range ($\lambda$1e, $\lambda$2e). While this is true for many dyes, a considerable number of dyes show multiple excitation peaks and multiple emission peaks (see FIG. 11). In such cases, each peak in the optionally normalized spectrum reaching an intensity of 50% or more (preferably 75% or more) may serve as emission peak ($\lambda$1e, $\lambda$2e) or absorption peak ($\lambda$1a, $\lambda$2a) for the purposes of the present invention, so that there may be multiple $\lambda$1e and $\lambda$1a, or multiple $\lambda$2e and $\lambda$2a.

The explanations above then apply to each of the peaks and wavelength ranges. For instance, it goes without saying that it is sufficient that there is an overlap between any $\lambda$1e and any $\lambda$2a, so that energy is transferred from the donor to the acceptor.

When the excitation or emission spectrum of a dye contemplated for use in the present invention shows several overlapping peaks, the peaks and wavelength ranges are obtained by fitting the obtained spectrum using a suitable software (least square method), such as for instance OCTAVE. Herein, a spectrum of overlapping peaks can be satisfactorily (Goodness of Fit <0.1) simulated by assuming an overlap of two (or rarely three) peaks, and the simulated values are taken for the identification of the peak wavelengths and for the identification of the wavelength ranges.

Dyes

Generally speaking, both the first dye DYE1 and second dye DYE2 used in the respective inks INK1 and INK2 employed in the cascade embodiment preferably show excitation bands and emission bands in the range of 40 to 2400 nm, in particular 300 to 1100 nm. Preferably, the donor dye DYE1 shows emission bands, in particular the maximum emission, in the UV range or visible range (in particular 300 to 700 nm), and the acceptor dye DYE2 shows excitation bands (to be excited by the donor), in particular the maximum excitation, in the visible or IR range (in particular 400 to 1100 nm). More specifically, the donor dye shows preferably emission band(s) matching acceptor dye excitation band(s) in the range 250-900 nm Fluorescent dyes useful for preparing the inks according to the cascade embodiment and for implementing the authentication method, can be suitably selected from commercially available dyes. They can for instance be selected from the following substance classes:

Cyanines (polymethines) and the related cyanine-type chromophors, quinones and the related quinone-type chromophors, porphines, phtalocyanines and the related macrocyclic chromophors as well as polycyclic aromatic chromophors.

Cyanine (polymethine) dyes are known in the art and used as photographic sensitizers (D. M. Sturmer, The Chemistry of Heterocyclic Compounds, Vol 30, John Wiley, New York, 1977, pp 441-587; Eastman Kodak). In a more recent application, stable representatives of this compound class, selected from the coumarins and rhodamines, were also used as laser dyes (J. B. Marling, J. H. Hawley, E. M. Liston, W. B. Grant, Applied Optics, 13(10), 2317 (1974)). Known fluorescent Rhodamine dyes include e.g. Rhodamine 123, Rhodamine 6G, Sulforhodamine 101, or Sulforhodamine B.

Phthalocyanines and related dyes are the "industrial variant" of porphines and include a greater number of well-known fluorescent dyes. They generally absorb at the long wavelength end of the visible spectrum. The class of phtalocyanines at large comprises as well the higher-conjugated analogs, such as the naphthalocyanines, which absorb farther in the IR, as well as the heterosubstituted analogs of phtalocyanines; the common point defining this compound class is that all of its members are derived from aromatic ortho-dicarboxylic acids or from their derivatives.

Quinone dyes are known in the art and used for textile and related dying applications (e.g. indigoid dyes, anthraquinone dyes, etc.). Electronegative groups or atoms along the quinone skeleton can be present to enhance the intensity of the absorption band, or to shift it to longer wavelengths.

Fluorescent aromatic polycyclic dyes include a rigid, planar molecular structure (similar to the graphite lattice) which may carry substituents. Typically the planar molecular structure comprises at least two fused aromatic benzene rings (e.g. 2 to 6 rings). In one of the fused aromatic rings, e.g. the central ring of three fused six-membered aromatic rings, one or two carbon atoms may be replaced by C=O, O and/or N. Fluorescent members of this class of dyes and pigments can be selected e.g. from perylenes (e.g. Lumogen F Yellow 083, Lumogen F Orange 240, Lumogen F Red 300, all available from BASF AG, Germany), naphtalimides (e.g. Lumogen F Violet 570, available from BASF AG, Germany) quinacridones, acridines (e.g. Acridine orange, Acridine yellow), oxazincs, dioxazines, or fluoroncs (e.g. Indian Yellow) are examples of such dyes.

A suitable pair of donor and acceptor dyes can be properly selected from these and other known fluorescent dyes based on their spectral properties, which, as a rule, are published by the manufacturer and can be easily measured, as explained above. However, the excitation effect on the dried printed ink composition is important, so that published data generally should be validated by measuring the absorption and emission spectrum in accordance with the method described above for a printed ink on the final substrate. Indeed, published data may relate to solutions of the dyes in a particular solvent (e.g. $CH_2Cl_2$) wherein the spectral properties may be different from the printed ink, e.g. due to interaction with the substrate.

Even if only the excitation and emission maxima are available (before complete absorption and emission spectra have been measured) an evaluation will be possible to what extent the emission spectrum of the donor is likely to overlap with the excitation spectrum of the acceptor dye thereby allowing a screening of suitable candidates.

The description above has been provided for patterns formed from two printing inks, containing one donor dye or pigment (DYE1) or one acceptor dye or pigment (DYE2). However, also more than one (e.g. two or three) donor dyes or pigments may be used in a single ink INK1, and these may be used to excite more than one (e.g. two or three) acceptor dyes or pigments in INK2. Also, it is possible to use a single donor dye or pigment in an INK1, which emits in a wavelength range $\lambda$1e that overlaps with both an absorption range $\lambda$2a of an acceptor dye or pigment present in ink INK2 to cause emission in a wavelength region $\lambda$2e, and an absorption range $\lambda$3a of another acceptor dye or pigment present in a further INK3 to cause emission in a wavelength region $\lambda$3e. In this case, a first pattern produced by the cascade effect will be observed in the areas of overlap between the discrete elements forming the first pattern (from INK1) and second pattern (from INK2), and a second pattern produced by the cascade effect will be observed in the areas of overlap between the discrete elements forming the first pattern (from INK1) and the third pattern (from INK3). As the respective first, second and third pattern are formed by randomly distributed discrete elements, this will also apply to the patterns formed by the cascade effect in the areas of overlap between the discrete elements forming the first, second and third pattern. In consequence, the cascade effect produces two new patterns of randomly distributed discrete elements, which have specific spectral properties due to the specific combinations of the dyes in inks INK1, INK2 and INK3, respectively, and which can only be observed under certain illumination conditions. This will be even more difficult to analyze and counterfeit.

Also, in the case of an acceptor dye showing two different emission peaks in different emission wavelength regions $\lambda 2e$, $\lambda 2e'$, in response to excitation in two different excitation wavelength regions $\lambda 2a$, $\lambda 2a'$, the acceptor dye or pigment may be used in combination with two donor dyes or pigments (in the same or different inks) having respective emission ranges $\lambda 1c$ and $\lambda 3e$. Preferably, the two donor dyes used in this embodiment have overlapping excitation ranges $\lambda 1a$ and $\lambda 3a$, so that excitation with a single wavelength (from e.g. a laser) is capable of exciting both donor dyes to cause emission in both emission wavelength regions of the acceptor dye.

Printing Ink Compositions Used in the Cascade Effect Embodiment

The printing ink used in the cascade effect embodiment of the present invention comprises at least one fluorescent dye or pigment acting as a donor, and at least one fluorescent dye or pigment acting as an acceptor, as explained above. However, the printing ink is typically not simply a solution or dispersion of one of these two dyes or pigments in a solvent, but contains further components that render it suitable for use as an ink for spraying or another printing process that causes a random distribution of discrete elements formed by the ink. Also, the inks should remain on the substrate and should be difficult to remove, which requires additional components. Such components typically include at least a solvent and a binder, and optionally also a curing system for fixing the discrete elements, as well known to the skilled person.

The solvent can be selected from solvents commonly used in the art of ink formulation such as aliphatic or aromatic alcohols (e.g. ethanol, isopropanol or benzyl alcohol), esters, (e.g. ethyl acetate, butyl acetate), ketones (e.g. acetone, methyl ethyl ketone), carboxamides (e.g. diamethylformamide) or hydrocarbons including aliphatic and aromatic hydrocarbons such as xylene or toluene and glycols.

The binder can also be selected from binders commonly used in the art of ink such as polymeric binders of the resin type, e.g. alkyd resin, polyamide, acrylic, vinyl, polystyrene, or silicone.

In one embodiment, the printing ink of the invention may also comprise other, in particular, non-luminescent dyes or pigments. These other dyes or pigments are selected such that they mask the presence of donor and/or acceptor dye or pigment, thereby rendering their presence a covered secured feature. This masking is preferably effected by using other dyes that do not strongly absorb in the emission wavelength range of donor or acceptor $\lambda 1e$, $\lambda 2e$.

However, in order to avoid any interference with the cascade effect, the printing inks preferably do not contain any further coloring additives, such as additional dyes and pigments. In this case, nonetheless the presence of the printing ink may be masked by printing the ink of the present invention on a region of a substrate that is strongly colored, e.g. in black.

Depending on the type of ink to be formulated, the same may also include one or more of the following optional additives: oils, diluents, plasticizers, waxes, fillers, dryers, antioxidants, surfactants, defoaming agents, catalysts, UV-stabilizers, polymerizable compounds and photoinitiators. When selecting suitable components for the printing ink, the skilled person will consider that their properties, in particular their potential capacity to absorb and/or emit light, does not adversely affect the energy transfer (cascade effect) from the donor dye to the acceptor dye.

In the inks used for producing the cascade effect, the proportion of the fluorescent dyes based on the total dry content of the ink is preferably 0.05 wt.-% to 20 wt.-%.

Without wishing to be bound by theory, it is believed that the cascade effect occurs to a major degree at or close to the boundary between INK1 and INK2. In order to allow for an efficient energy transfer from the donor in INK1 for exciting the acceptor in INK2, donor and acceptor need to come reasonably close to each other. Accordingly, it is preferred in the present invention that INK1 and INK2 are provided adjacent to each other in z direction. It should be noted that a substrate is assumed to have a predominantly two-dimensional extension, preferably planar, that is describable by coordinates referred to as x,y, and that the third direction (third dimension) perpendicular thereto and connecting the two opposing surfaces of the substrate is referred to in this description as the z direction.

A more prominent effect can thus be achieved if INK1 and INK2 are provided over each other, and wherein the solvent system of one of the inks (preferably the one applied on top of the other, i.e. the one that is applied later) is capable of at least partially dissolving the other ink, respectively the ink layer formed therefrom. In such a case, the ink layers mix at the interface to some extent, thereby allowing the donor and acceptor to come close to each other, thereby improving the efficiency of the cascade effect.

In one embodiment, INK1 is applied first on the substrate, forming a first pattern. That is, a substrate (e.g. paper or cardboard) is provided, INK1 comprising the donor is provided first, and subsequently INK2 comprising the acceptor is provided on top of INK1 to form the second pattern. In consequence, at least a part of the discrete elements of the first pattern are provided in an overlapping manner on top (in z direction) of discrete elements of the second pattern.

The present invention is however not limited to such an arrangement, as INK2 (comprising the acceptor) may also be provided beneath INK1 (comprising the donor). However, since in this case the fluorescence emission from the dye or pigment DYE2 caused by the cascade effect, which may be used for authentication purposes, has to cross a layer formed by INK1 in order to exit the security element and to reach a detector, generally preferred is an arrangement wherein elements of the first pattern formed from INK1 comprising the donor are formed first (e.g. directly on a substrate), and wherein discrete elements of the second pattern formed from INK2 comprising the acceptor are formed over at least a part of the area occupied by the discrete elements of the first pattern (ROI), such that at least a part of the discrete elements of the first and second pattern overlap. If the alternative arrangement is chosen, i.e. wherein in a region of overlap of discrete elements INK2 forms the lower layer closer to the substrate and wherein a part of a discrete element formed from INK1 is provided on top, it is preferred that INK1 is substantially translucent or transparent with a light transmission at $\lambda 2e$ of 60% or more, preferably 80% or more, at the thickness employed for the security element, in dry state.

For INK2, the material is preferably also translucent or transparent with a light transmission at $\lambda 2e$ of 60% or more, preferably 80% or more, at the thickness employed for the security element, in dry state, in order to avoid quenching of the emission in the material. Further, in particular—but not exclusively—if INK2 is provided above or on top of INK1, INK2 is preferably also translucent or transparent with a light transmission at λ1a of 80% or more, preferably 90% or more, at the thickness employed for the security element, in dry state, in order to allow efficient excitation of the donor in INK1.

Also the printing methods have a significant impact on how the two ink layers in a region of overlap of discrete elements will interact at the interface. In a particular embodiment of the invention, two different application methods for the two distinct patterns are used. It is an additional advantage of the invention that the response—and hence a feature that may be used for authentication—will also depend on the ink application methods employed.

With respect to the ink formulation, the combination of
1) the solvent used to print the secondly applied ink (SOLVENT T2) and
2) the type of resin or varnish or any other material which will form the solid dry material from the formulation of the firstly applied ink (RESIN T1)

has a substantial impact on the efficiency of the cascade effect at the ink layers' interface in the overlap region for the following reason. Here, and also in the following, a component denoted with T1 or T2 represents a component of the material applied firstly (T1) or secondly (T2). Yet, material applied firstly (T1) may be either of INK1 and INK2. The material applied secondly (T2) it then the respective other material.

In case that RESIN T1 cannot be dissolved by SOLVENT T2, or in the case where RESIN T1 is densely packed so it does not allow the secondly applied ink to diffuse into the interface with the firstly applied ink, the interface will show an abrupt or sharp transition from INK1 to INK2 respectively the dried layers obtained therefrom, and the energy exchange between the donor and acceptor will not be favorable to the cascade effect because only a few of them will be close to the others.

On the other hand, if SOLVENT T2 can dissolve partially RESIN T1 at the interface, or if RESIN T1 is porous enough to let the secondly applied ink diffuse into the firstly applied ink, an intermediate region will be formed. Here, DYE1 in INK1 and DYE2 in INK2 will come closer to each other, so that the average distance between the two is reduced for a significantly larger amount thereof. This enhances the efficiency of the cascade effect. Note that it is advantageous that RESIN T1 is freely miscible with RESIN T2, i.e. that no phase separation between the two occurs. This can be achieved by using the same or chemically similar materials as RESIN T1 and RESIN T2.

Therefore, the formulations of INK T1 and INK T2 are preferably such that INK T1 is a solvent based ink providing a relatively porous print and that SOLVEN T2 is able to dissolve RESIN T1 to a certain extent and diffuse within the ink layer formed first.

There is another factor that influences the proximity of the donor and acceptor dyes or pigments and hence the efficiency of the cascade effect. In particular, in cases where INK1 contains donor pigments, which are typically solid, isolated and non-soluble grains, there is an additional challenge for the ink formulation to provide the acceptor dye or pigment close to the donor pigments. For an efficient energy transfer, not only the concentration of the pigment in INK1 within the dry ink layer should be sufficient, but also the position of these (at the surface or uniformly distributed within the layer) is critical and can be controlled by ink formulation. This can be achieved by the skilled person by resorting to common knowledge in the field of ink formulations.

For an efficient energy transfer, not only the concentration of the donor pigment in INK1 within the dry ink layer should be sufficient, but also the position of these (at the surface or uniformly distributed within the layer) is critical and can be controlled by ink formulation. This is an additional lever to tune the efficiency of the cascade effect that can be exploited in the invention, as again a counterfeiter would have to mimic not only the components employed, but also their interaction, as influenced by the arrangement of the components at the interface. These effects are also demonstrated in the Example provided at the end of the specification.

Experimental Results

INK1 and INK2 as described above were formulated. The first ink INK1 was obtained by adding 0.12 wt.-% of Lumogen® F Yellow 083 (lum1) to the blank preparation. Such low weight % of dye guarantees that INK1 is practically invisible to the naked eye when applied and dried. The second ink INK2 was obtained by adding to the blank 1.23 wt.-% of Lumogen® F Orange 240. The marks printed with INK2 were visible to the naked eye and were imaged using a PMVS (Public Machine Vision System, such as a smartphone, tablet, smart-camera, camera/computer, scanner/computer, etc.), whereas the ones printed with INK1 remained invisible.

Samples having a wet film deposit of 12 µm thickness were then prepared, using e.g. a K Control Coater from RK Print Coat Instruments using, e.g., the HC2 coating bar, on a suitable white substrate (e.g. the white part of LENETA N2C-2 substrates), followed by drying at room temperature. Three samples were prepared:
1. Sample1 with INK1 only
2. Sample2 with INK2 only
3. Sample3 with INK1 followed by INK2 further to ink 1 drying (the reverse was also tested and gave similar results)

All three samples were then imaged using a PMVS in reflection mode and using an SMVS (Secure Machine Vision System, i.e. a dedicated security device) sensitive in the 610-900 nm wavelength range, under blue illumination (around 450 nm) and green illumination (around 530 nm). The corresponding measured intensities of the 3 samples were then used to compose a spray spatter as illustrated in FIG. 8.

Figure 8:
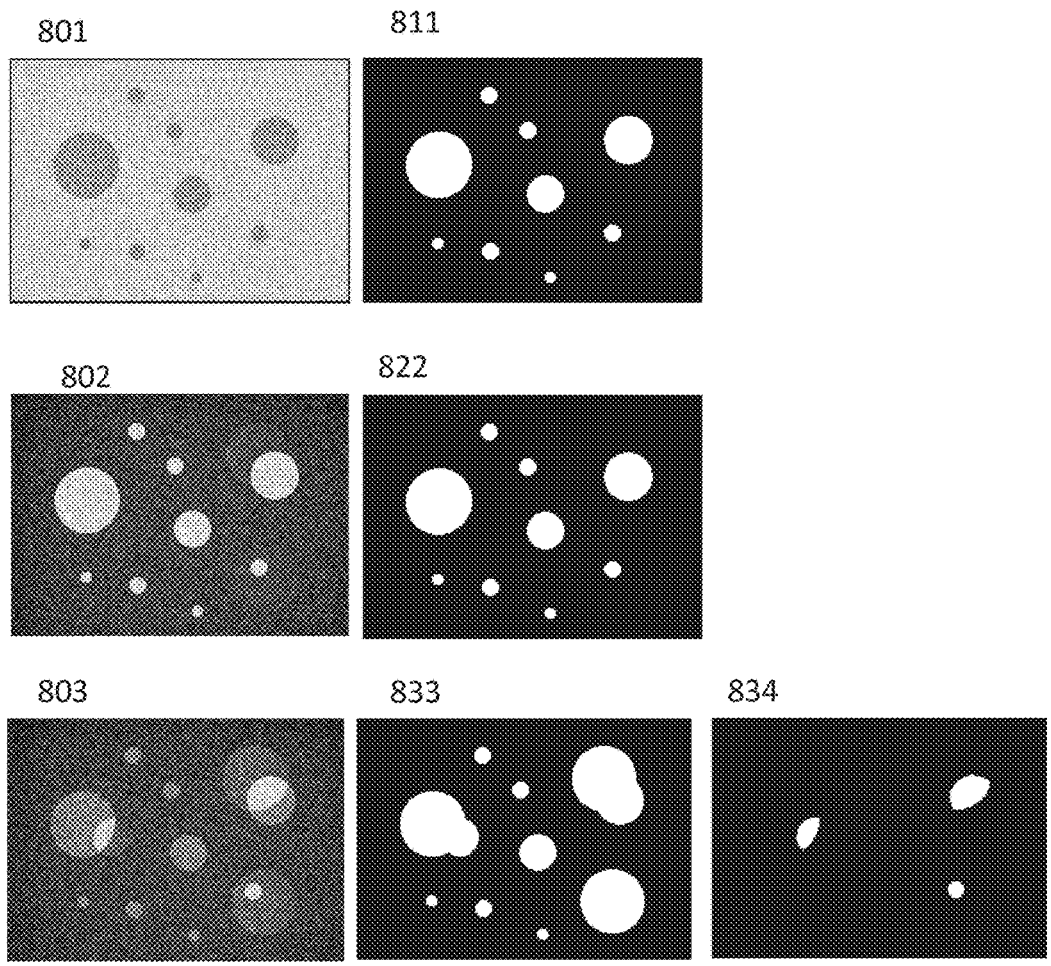
FIG. 8 shows examples of spray spatter patterns for explaining aspects of the present invention.

At the top of FIG. 8, a grey-scale picture 801 of the visible spray spatter acquired using a PMVS in reflection mode shows only the orange stains obtained from INK2. The visible stain contour 811 was obtained by suitable image processing, such as Otsu-thresholding (ref: Nobuyuki Otsu (1979). "A threshold selection method from gray-level histograms". IEEE Trans. Sys., Man., Cyber. 9 (1): 62-66). From this contour a first signature S1 was generated.

On the second line of FIG. 8, the picture 802 of the spray spatter, obtained using a SMVS with green illumination around 530 nm shows, after proper image threshold operation, a contour 822 identical to the contour 811 from the PMVS. From this contour a signature S1' is generated which is substantially equal to S1. This is because the weak excitation of INK1 in green at 530 nm (see FIG. 11) makes it non-detectable, similarly to picture 801 where it is invisible.

At the bottom of FIG. 8, a picture 803 of the mark using a SMVS with blue illumination around 450 nm exhibits the full complexity of the synergic security element. Here both INK1 and INK2 stains are visible and their combined contour 833 can be extracted to produce a signature S2 with more complexity and resistance to copy than S1=S1'. Moreover, picture 803 also reveals a higher intensity at the overlap of stains from both inks, whose contours 834 can be extracted to generate signature S3 which exhibits the highest level of resistance to copy.

Figure 9:
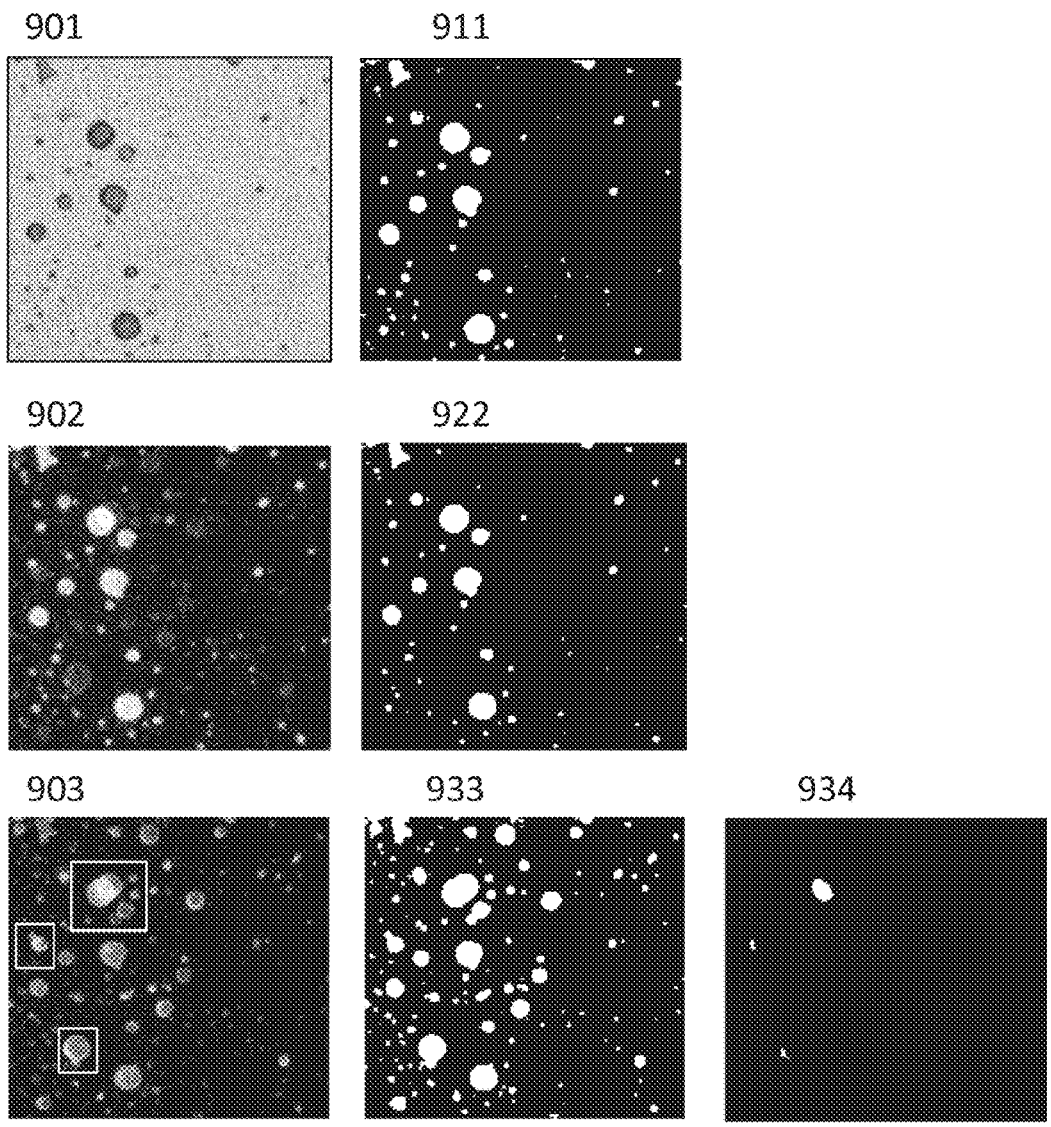
FIG. 9 shows further examples of spray spatter patterns for explaining aspects of the present invention.

A further example is shown in FIG. 9, where both INK1 and INK2 were sprayed sequentially on a substrate. It was ensured that both spray spatters had surface coverages that favored sufficient stain overlap and that the first applied ink had dried before the second ink was applied. The result is shown in FIG. 9 and can be interpreted the same way as for FIG. 8 by replacing 801 with 901, 811 with 911, and so forth.

Image Processing

In order to obtain signatures from gray scale images of spray spatters, such as e.g. 901, 902, or 903 in FIG. 9, several image processing and numerical operations can be performed. First, regions of the spray stains and stain overlaps have to be detected on the image using thresholding techniques. Thresholding is the simplest method of image segmentation. From a grayscale image, thresholding can be used to create binary images (References: L. G. Shapiro, G. Stockman, "Computer Vision," Prentice Hall, 2002; R. C. Gonzalez, R. E Woods, "Digital Image Processing," Third Edition, Pearson-Prentice Hall, 2008). There are several known methods for thresholding such as histogram shape-based methods, where, for example, the peaks, valleys and curvatures of the smoothed image histogram are analyzed, or clustering-based methods, where the gray-level samples are clustered in two parts as background and foreground (object), or alternately are modeled as a mixture of two Gaussians. Also entropy-based methods which use the entropy of the foreground and background regions, or the cross-entropy between the original and binarized image could be used. Another approach using object attribute-based methods searching a measure of similarity between the gray-level and the binarized images, such as shape similarity or edge coincidence could be applied.

A person skilled in the computer vision art could also make advantageous use of other image processing techniques to extract other features of the stains such as intensity gradients.

Once segmented or binarized, images such as 911, 922, 933 or 934 in FIG. 9, representing the regions of stains are obtained; further numerical treatments can be applied to extract a digital signature from the features of the stains. In increasing order of complexity, non-limiting examples of features that can be extracted are:

The number of disjoint stains in the binarized image,
A stain list of the coordinates of the stain centroids,
Geometrical features such as the area (represented by a number of pixels), or the diameter of the stain equivalent disc,
More complex geometrical parameters such as convexity or eccentricity of each contour,
Combinations of the above.

The above image processing and feature extraction operations may be performed in the same way during the generation of the security arrangement (also referred to as enrollment) and during authentication/identification as described below.

Example of Producing Signatures from a Security Arrangement

Figure 12:
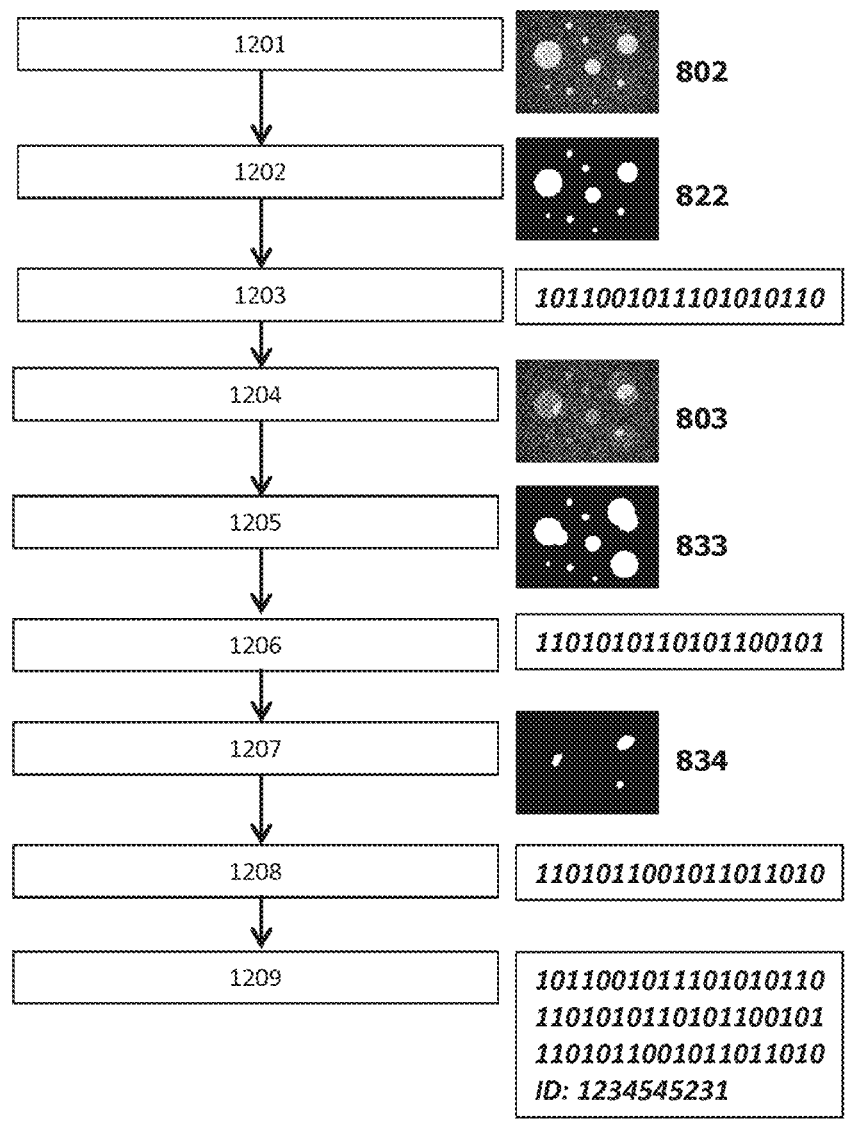
FIG. 12 shows a flow diagram of an example process of signature enrollment in a database.

FIG. 12 shows a flow diagram of a possible process of signature enrollment in a database. The aim of this process is to extract from the patterns the three signatures {S1'=S1, S2, S3} from a minimum number of pictures. This can e.g. be achieved using a SMVS operated in fluorescence by the following steps.

First, a picture 802 of the mark is acquired using illumination in wavelength range, (step 1201), the spatter contour is extracted (step 1202). e.g. by image thresholding, and signature S1'=S1 is generated (step 1203) by applying the image processing and feature extraction operation as described above. The same operation is performed from picture 803 using illumination in $\lambda_{1a}$ wavelength range (step 1204) to get signature S2 from contour 833 (steps 1205, 1206) and signature S3 from contour 834 (steps 1207, 1208). More specifically, step 1204 comprises imaging picture 803 of spray spatter with illumination in $\lambda_{1a}$ wavelength range, step 1205 comprises extracting spatter contour 833, e.g. using a first image threshold, step 1206 comprises generating a signature S2, step 1207 comprises extracting spatter contour 834 e.g. using a second image threshold, and step 1208 comprises generating signature S3.

All three signatures are then stored in a database (step 1209) with optionally a product ID, an item serial number and/or product information.

Example of an Authentication/Identification Process

Figure 13:
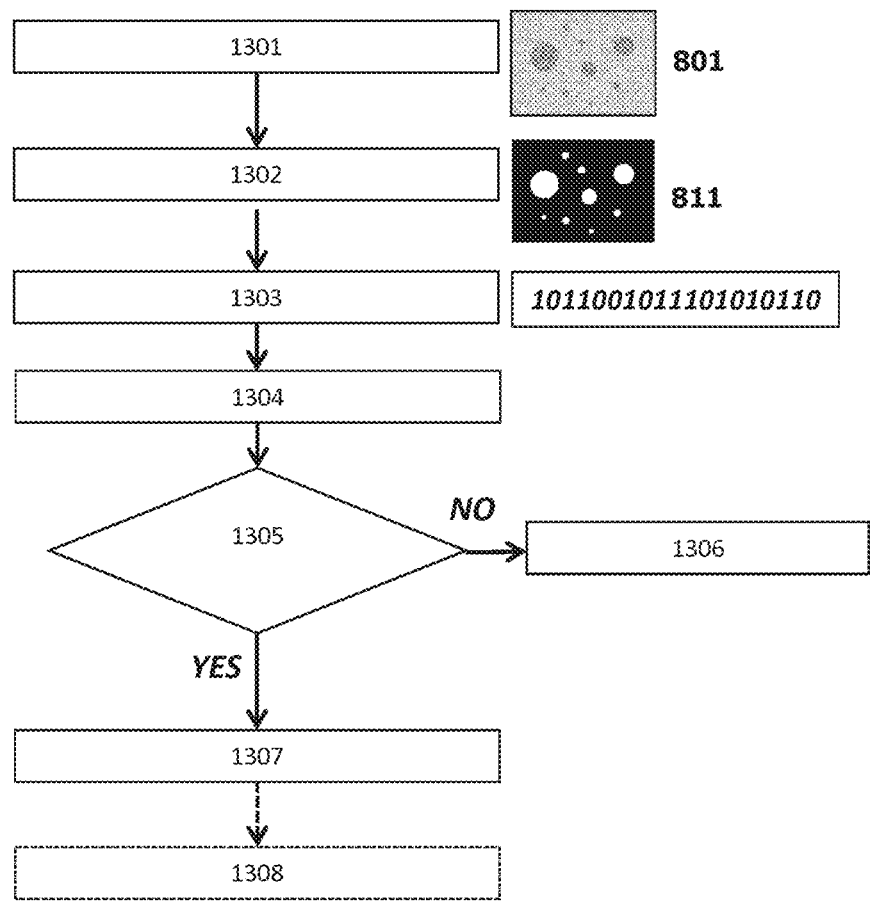
FIG. 13 shows a flow diagram of an example of an authentication/identification process.

The authentication/identification process having a confidence level L1 using a PMVS by the public or occasional auditors/inspectors is described in FIG. 13. It consists of acquiring (step 1301) a picture 801 of the visible spray spatter, extracting (step 1302) contour 811, e.g. using an image threshold, and generating (step 1303) signature S1 by applying the same image processing and feature extraction operation as the one used for signature enrolment. The obtained signature is queried from the database (steps 1304, 1305). For example, step 1304 may comprise sending the signature S1 to the database, and step 1305 may comprise checking whether the signature can be found in the database. If signature S1 is found in the database, the security element is considered authentic or genuine with confidence level L1 (step 1307), if not, the security element is declared non-genuine (step 1306). If the security element is authentic, other information on the product such as product ID can optionally be retrieved from the database and sent to the PMVS (step 1308).

Authentication/identification with higher level of confidence can be achieved using a dedicated inspection device (e.g. a SMVS) designed to be operated in luminescence mode. Two possible implementations are presented in FIGS. 14 and 15.

Figure 14:
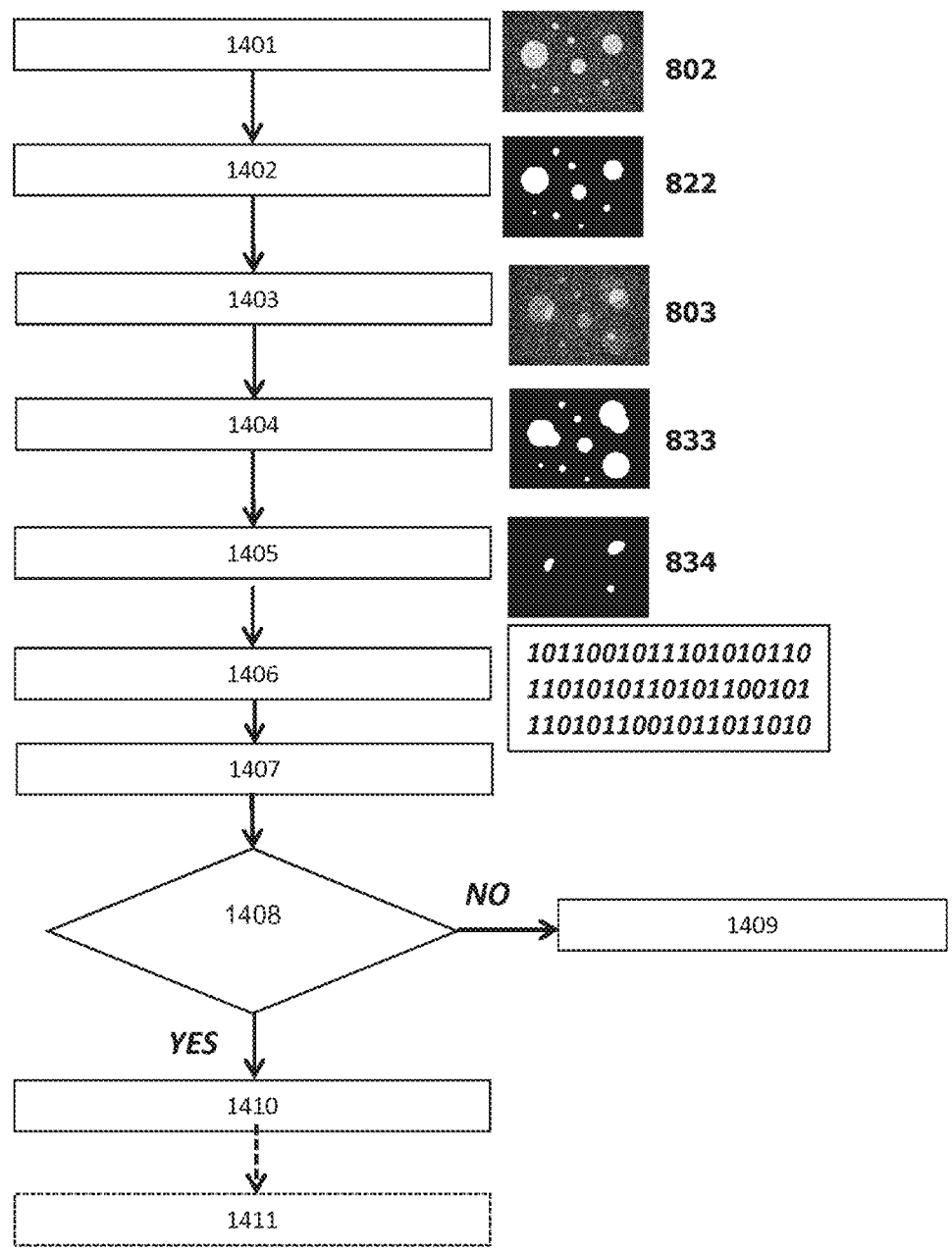
FIG. 14 shows a flow diagram of another example of an authentication/identification process.

FIG. 14 presents a full-fledged authentication/identification method with confidence level L3. Step 1401 comprises imaging picture 802 of spray spatter with illumination in the $\lambda_{2a}$ wavelength range. Step 1402 comprises extracting spatter contour 822, e.g. with an image threshold. Step 1403 comprises imaging picture 803 of the spray spatter with illumination in the $\lambda_{1a}$ wavelength range. Step 1404 comprises extracting spatter contour 833, e.g. with a first image threshold. Step 1405 comprises extracting spatter contour 834, e.g. with a second image threshold. Step 1406 comprises generating signatures {S1', S2, S3}. Step 1407 comprises sending the signatures {S1', S2, S3} to the database. Step 1408 comprises checking whether the signatures {S1', S2, S3} can be found in the database. In the case of no, step 1409 is performed, which comprises e.g. that the database returns a message "Mark is NON-Genuine". In the case of yes, step 1410 is performed, which comprises e.g. that the database returns a message "Mark Is Genuine with confidence level L3".

In summary, pictures 802 and 803 are obtained using a SMVS with illumination in the $\lambda_{2a}$ and $\lambda_{1a}$ wavelength ranges, respectively (steps 1401, 1403). From picture 802 the spatter contours 822 and signature S1' are obtained (steps 1402, 1406), and from picture 803 the spatter contours 833 and 834 and signatures S2 and S3 are obtained (steps 1404, 1405, 1406), respectively by applying the same image processing and feature extraction operation as the one used for signature enrollment. All three signatures are queried from the database (steps 1407, 1408). If all three signatures are found in the database, the mark is considered genuine with confidence level L3 (step 1410). If the three signatures are not found all together in the database, the mark is considered as non-genuine (step 1409). Optionally, the database may return product ID or other information if the security element is authenticated at level 3, see step 1411.

Figure 15:
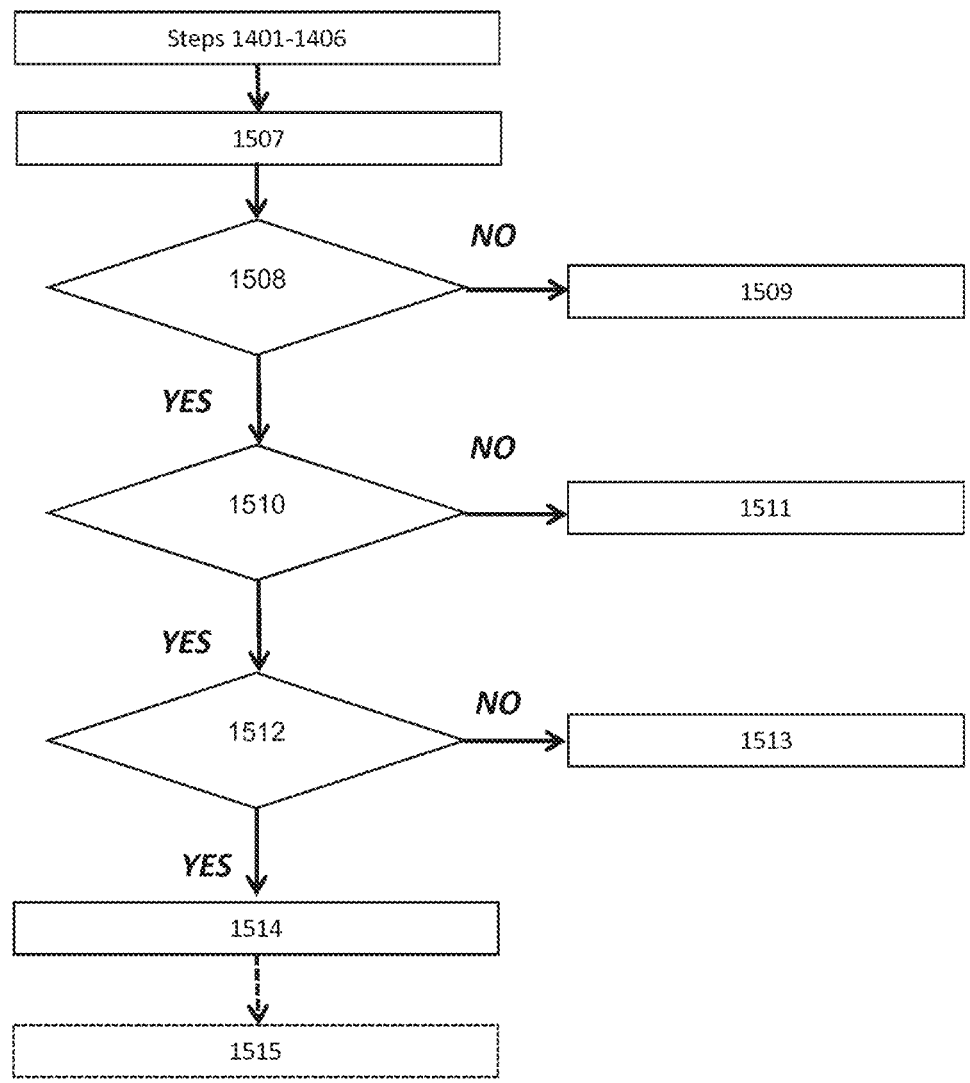
FIG. 15 shows a flow diagram of another example of an authentication/identification method.

Various authentication schemes using signature combinations could be implemented without diverging from the scope of the invention. FIG. 15 represents an example of another signature scheme implementation where distinct and progressive confidence levels L3>L2>L1 can be obtained. More specifically, steps 1401-1406 are executed like in FIG. 14 and step 1507 is identical to step 1407, but query step 1408 is replaced by a series of queries 1508, 1510 and 1512, each respectively querying whether S1, S2 or S3 can be found individually in the database. In other words, step 1508 queries whether S1 is found in the database, step 1510 queries whether S2 is found in the database, and step 1512 queries whether S3 is found in the database. If S1 is not found, then the security element is identified as inauthentic, see step 1509, which could e.g. comprise that the database returns a message "Mark is NON-Genuine". If S1 is found in the database, but not S2, then e.g. a message of "authentic with confidence level 1" is returned, see step 1511, which could comprise that the database returns a message "Mark is Genuine with confidence level L1". If S1 and S2 are found in the database, but not S3, then a message of "authentic with confidence level 2" is returned, see step 1513, which could comprise that the database returns a message "Mark is Genuine with confidence level L2". If all three signatures or indices are found, then a message of "authentic with confidence level 3" is returned, see step 1514, which could comprise that the database returns a message "Mark is Genuine with confidence level L3". Optionally, the database may return a product ID or other information if the security element is authenticated at level 3, see step 1515.

Embodiments Using Color Blending

As already described above, although the use of the cascade effect is very useful in connection with the concept of the present invention, the invention is by no means limited thereto, and other mechanisms can be employed for generating security elements in accordance with the present invention, in which a third pattern is used for defining the security element.

With the wide spread of Smartphone devices in the public and the progress in their imaging performance and computing capabilities, it is advantageous to implement an embodiment of the present invention that does not rely on luminescence properties, so that an authentication up to level 3 can be accomplished with conventional PMVS, such as camera systems in smartphones or the like.

Such embodiments may make use of color blending in the overlap regions of the two patterns. Color blending can be realized by depositing (by spraying, printing or other methods) sequentially two patterns using two different inks having different colors, ensuring minimum overlap of the two patterns. Color dyes or pigments are used to produce the ink color. Color blending occurs by color subtraction in the overlay regions and is intrinsically a non-linear process, the result of which is hardly predictable especially for non-white substrate (see reference book *Industrial Color Physics*, Klein, Georg A., Springer Series in Optical Sciences, Vol. 154, 2010, XIV).

A factor for color blending to occur through overlap of two sequentially deposited patterns, as opposed to blending the pigments of different colors in a single ink, resides in keeping the color saturation of the two inks at a relatively low level. This prevents one ink layer to dominate the other by complete coverage (excess of light absorption). Keeping the color saturation at a low level can easily be achieved by diluting the dyes or pigments.

Figure 20:
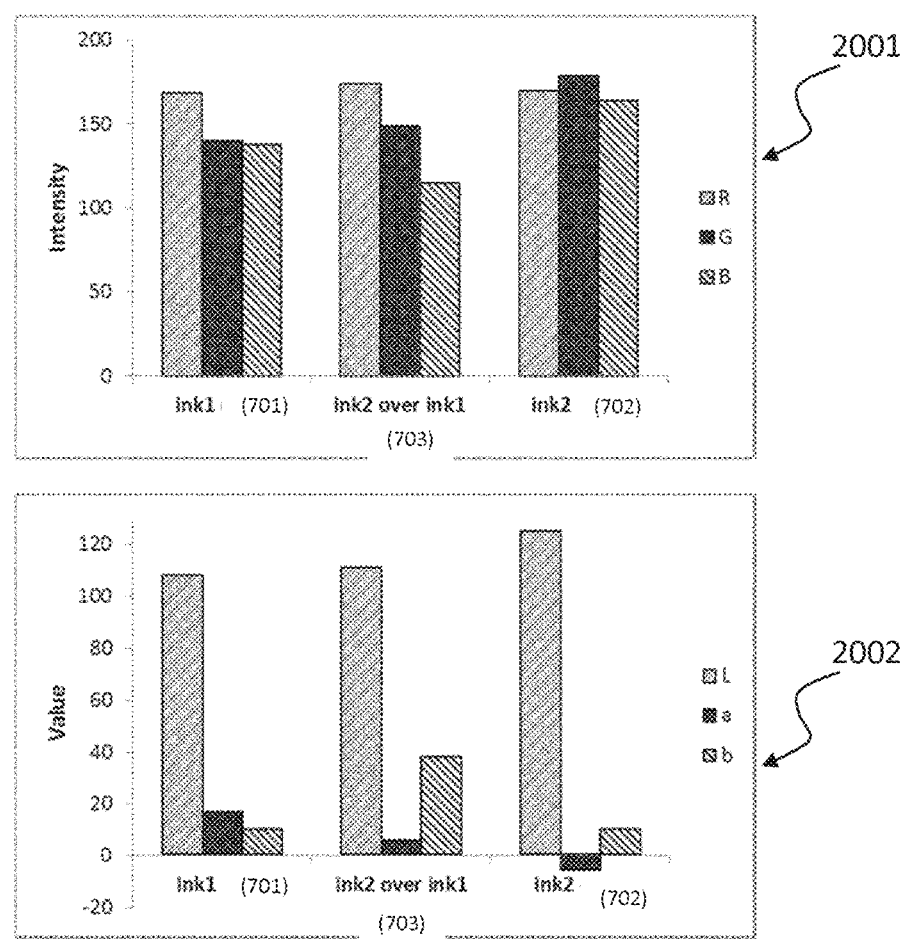
FIG. 20 shows graphs of color components in two different color spaces according to a color blending embodiment.

Reference is again made to FIG. 7, which also serves to illustrate color blending in a partial overlap of two spray stains (or of two patterns) obtained from two different inks. INK1 of color1 produces pattern 701, INK2 of color2 produces pattern 702 and the overlap is represented by pattern 703 of color3, obtained from color blending of color1 and color2. FIG. 20 shows color components in two different color spaces, of the 3 regions of FIG. 7, for the particular inks described in the detailed example of this embodiment. Namely RGB color components 2001 and CTE L*a*b* color components 2002. This demonstrates that each region has a distinct color vector.

Figure 21:
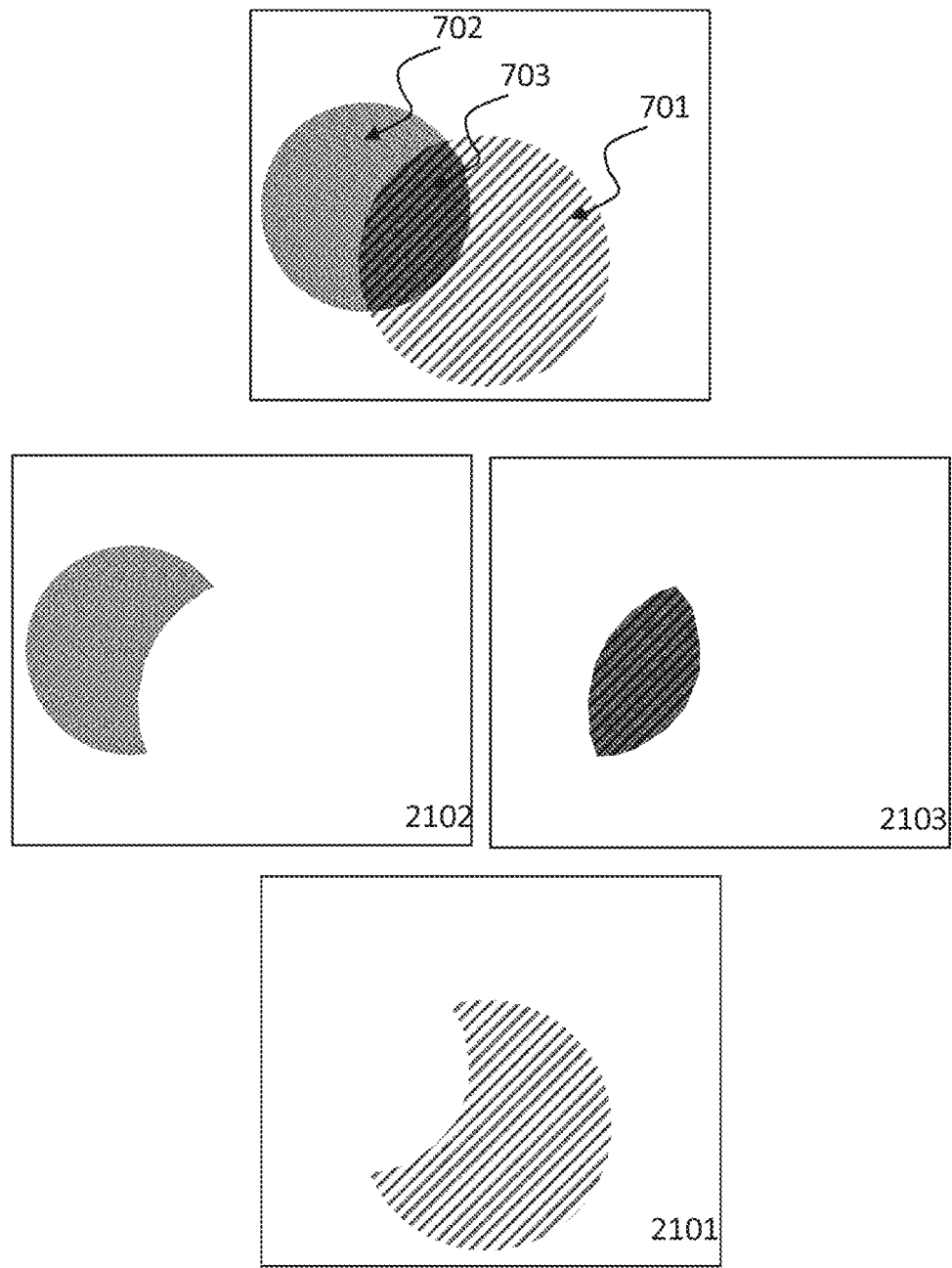
FIG. 21 shows contours extracted using a color deconvolution operation.

FIG. 21 shows the contours corresponding to the 3 regions of FIG. 10 extracted using a color de-convolution operation. From the contour geometrical properties, 3 signatures can be built: Sc1 2101 related to the properties of stains or pattern 701, Sc2 2102 related to the properties of stains or pattern 702 and Sc3 2103 related to the properties of the overlap region 703.

Figure 22:
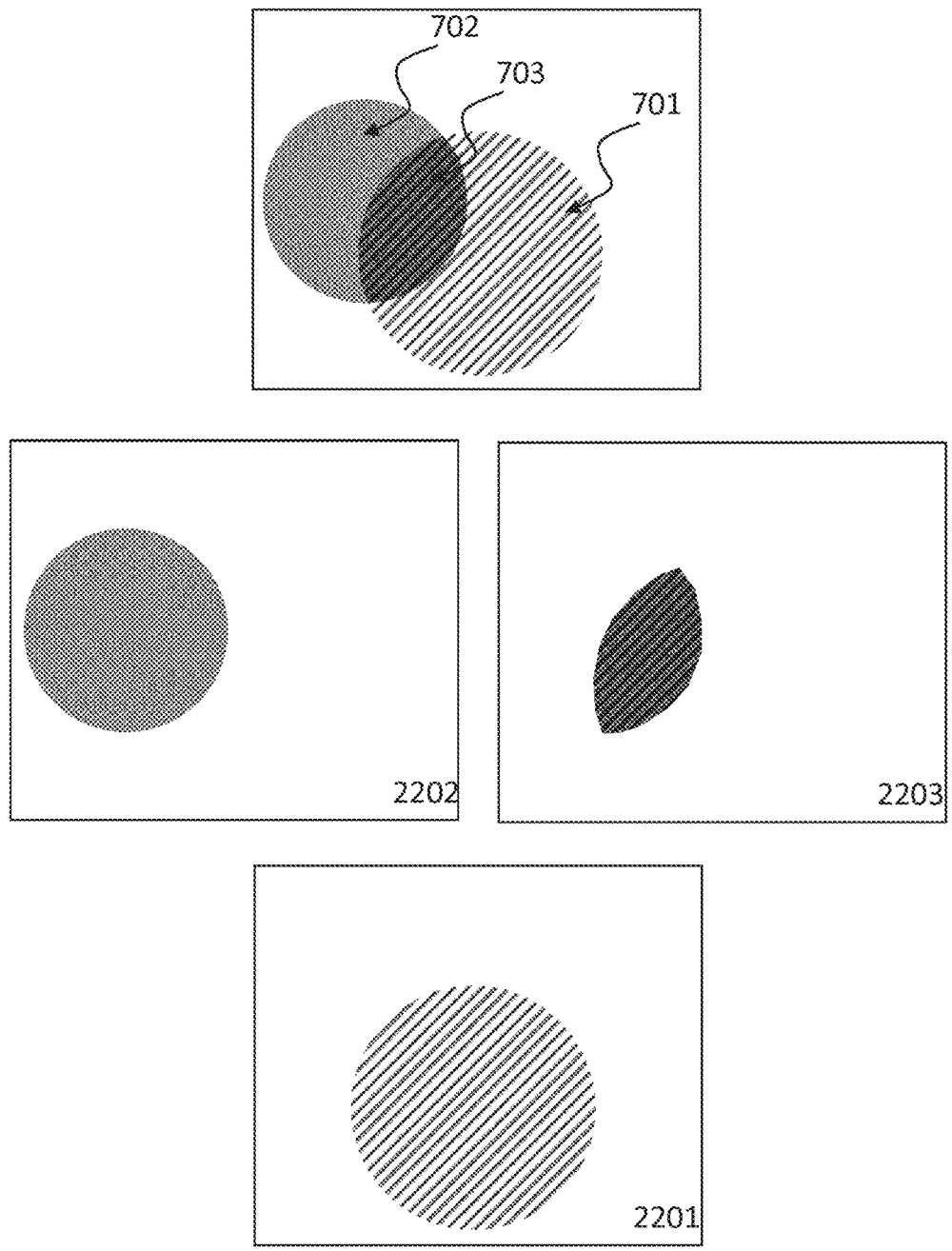
FIG. 22 shows contours extracted using color thresholding.

FIG. 22 shows an alternative contour extraction method by color threshold in the CIE L*a*b* color space. In this case the obtained contours represent the initial stains of INK1 2201 and INK2 2202, including the overlap region.

To illustrate the color blending effect that occurs for overlapping stains, two commercial color dyes were employed (Lumogen® F Orange 240 (BASF) (DYE1) and Lumogen. F Yellow 083 (BASF) (DYE2). Although these dyes also produce fluorescence which was used for demonstrating the cascade effect in the cascade embodiment of the invention, only their color properties were used in the present example of the color blending.

An orange ink (INK1) and a yellow ink (INK2) where formulated the same way as for the cascade effect example described above, except that the yellow INK2 was 3 times less diluted in order to be visible.

Individual ink patterns samples and overlay samples were prepared the same way as for the cascade effect example and imaged in reflectivity using white light illumination. After color balance correction, the 3 regions were analyzed by colorimetric algorithms to extract their respective color parameters in two different color spaces as shown in FIG. 20. From these graphs one can see that each of the 3 patterns has a distinct color vector (irrespective of the color space used) which can be used to discriminate the 3 patterns, and extract their contour from the image.

Different approaches can be used to extract the 3 pattern contours from their color properties, among these e.g.

1. Color de-convolution
2. Color thresholding

Color De-Convolution:

Color de-convolution is a known image processing technique in bio-medical imaging for separation and quantification of immuno-histochemical staining (see reference *Quan-* tification of hisochemical staining by color de-convolution, by Ruifrok A C, Johnston D A., in Anal Quant Cytol Histol. 2001 Aug. 23(4), 291-9). This operation, also termed color unmixing, is a particular case of blind source separation. Two random processes with two inks create random marks. The marks are observed on a set of three spectra (RGB) and the objective is to extract the stains created by each ink.

This task is better accomplished on optical density (OD) values obtained by the conversion of RGB values using the Beer-Lambert law. Up to three OD ink vectors in the OD RGB values can be defined. These vectors, once normalized, can be used to construct an OD convolution matrix. The inversion of this matrix (de-convolution matrix) provides a means to characterize the random marks in terms of the concentration of each ink.

Implementation of the color de-convolutions algorithm can be found in public domain image processing software, such as NIH's ImageJ (reference Landin G. (2004). *Colour Deconvolution plugin for ImageJ and Fuji*. Oral Pathology Unit, School of Dentistry, University of Birmingham. Available from http://www.dentistry.bham.ac.uk/landinig/software/edeconv/edeconv.html]

FIG. 21 illustrate how the 3 regions can be extracted from the image using color de-convolution. The result of color de-convolution are the 3 shapes 701, 702 and 703 used to generate 3 signatures:
2102: signature Sc1 (excluding the overlap)
2104: signature Sc2 (excluding the overlap)
2103: signature Sc3 (overlap only)
Color Thresholding:

Color thresholding is a common image processing technique for extracting colored areas in images from their color parameters. It can be applied in various color spaces with different discrimination capabilities.

Figure 23:
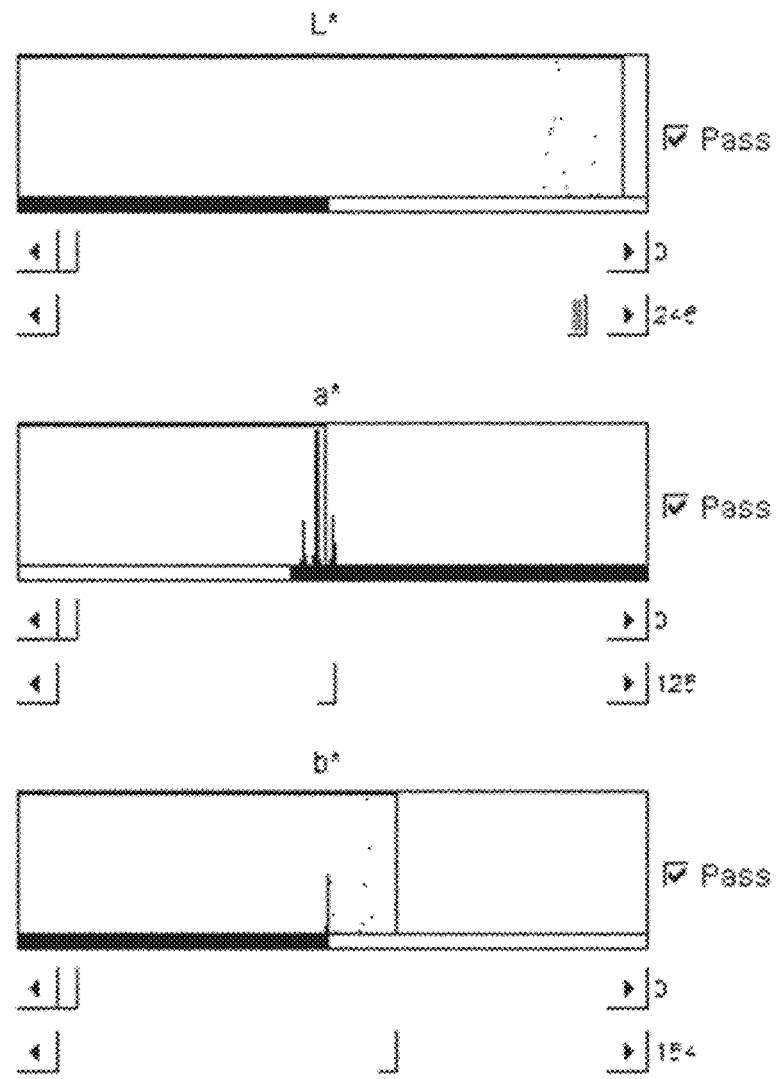
FIG. 23 shows histograms related to the color thresholding of FIG. 22.

FIG. 22 illustrates the result of 3 suitable color thresholding operations in the CIE L*a*b* color space (corresponding histograms are shown in FIG. 23) to extract the 3 contours corresponding to INK1, INK2, and the overlap. The result of the color thresholding in the L*a*b* color space allows to recover the original contours of INK1 and INK2 including the overlap
2201: signature Sc1' (including the overlap)
2202: signature Sc2' (including the overlap)
2203: signature Sc3 (overlap only)

From the extracted color regions in the image, contours can be defined by suitable image thresholding and signatures can be generated, the same way as for the fluorescence cascade effect embodiment described previously.

FORMULATION EXAMPLES

In the following formulation examples, two different formulations of INK1 were tested based on the following blank properties in order to determine the effect of ink compositions on the observed cascade effect:
1) INK1 with solvent-based blank formulation (FORMULATION blank A) where the dry inks layer is thin and hence pigments are concentrated and much of them are close to the top surface
2) INK1 with UV-curable resin blank formulation (FORMULATION blank B) where dry ink layer is significantly thicker, the pigments are homogeneously distributed along the thickness (z axis) of the print layer, and consequently, the pigment concentration at the surface of the print is reduced as compared to the solvent based ink Both of these inks blanks are used for silk-screen inks and their respective formulations are described in details below.

For the formulation example described here, two examples of INK1 using the two different blanks were formulated by adding 15%-weight of Lumilux® green SN-F2Y pigment (Honeywell) as donor. A test patch of each formulation is first silk-screen printed on a suitable white substrate (e.g. the white part of LENETA N2C-2 substrates) with a 90T silk-screen frame, followed by solvent evaporation drying for the FORMULATION A and UV curing for the FORMULATION B.

A typical digital printing ink blank was formulated for INK2 (detailed FORMULATION C below). INK2 is obtained by adding to the blank 0.3%-weight of Lumogen® F Orange 240 fluorescent dye as acceptor.

For the purpose of the example described here, INK2 was applied with a spray device (Nordson Microspray EFD Series 787MS-SS) and using a rectangular mask to produce a distinguishable pattern on top of, and partially covering each of the two silk-screen printed patterns. The spray parameters were adjusted so as to produce a dry film equivalent to the one obtained from a wet film deposit of 12 μm thickness prepared using e.g. a K Control Coater from RK Print Coat Instruments using, e.g., the HC2 coating bar, followed by drying at room temperature.

The efficiency of the cascade effect for the 2 samples was measured with a camera equipped with a lens and a long pass optical filter to transmit mainly the fluorescence from INK2 in a wavelength range between 600 nm and 950 nm, while using a deep blue LED emitting at a peak wavelength of 410 nm for the excitation of INK1 only (INK2 is only very weakly excited at the wavelength range where the deep UV LED is emitting). The average intensity emitted by the patch of INK2 was obtained from stored bitmap images and can be represented, with reference of FORMULATION B at 100%, as follows:

| INK1 blank formulation | Cascade efficiency |
|---|---|
| Formulation A (solvent-based) | 152% |
| Formulation B (UV-curable) | 100% |

This example demonstrates that the cascade efficiency can be increased by more than 50% depending on the blank ink formulation of INK1, which comes from a larger amount of the phosphorescent pigment being available at the interface to the layer formed from INK2.
Formulation Blank A (Solvent Based):

21.3% NeoCryl B-728, 51.6% Butylglycol acetate, 21.7% Ethyl-3 ethoxypropionate, 0.3% Aerosil 200, 1.3% Byk-053 (anti-foam agent), 3.5% Dowanol DPM, 0.3% BYK-D410. (surfactant)
Formulation Blank B (UV-Curable):

31.5 wt.-% Tripropyleneglycol diacrylate monomer, 17.9 wt.-% trimethylolpropane triacrylate, 19.0 wt.-% EBECRYL™ 2959, 11.6 wt.-% EBECRYL™ 80, 2.1 wt.-% TEGO® Airex 900, 1.0 wt.-% GENORAD™ 20, 9.5 wt.-% Calcium carbonate, 2.1 wt.-% Benzil dimethyl ketal and 5.3 wt.-% IRGACURE® 1173.
Formulation C (Digital Ink):

87%-weight Methylethylketone, 10.3%-weight of a hydroxyl-containing copolymer made from 84%-weight vinyl chloride and 16%-weight of acrylic acid ester (commercially available from Wacker Chemie under the tradename VINNOL E15/40 A) and 2%/-weight of a terpolymer made from 84%-weight vinyl chloride, 15%-weight vinyl acetate and. 1%-weight dicarboxylic acid (commercially available from Wacker Chemie under the trade name VINNOL E15/45 M).

The invention claimed is:

1. A security element comprising a first and a second pattern formed in or on a substrate,
the first pattern being formed by discrete elements of a first material that are distributed over a first region of the substrate,
the second pattern being formed by discrete elements of a second material that are distributed over a second region of the substrate, said second material being different from said first material, said first and second regions of the substrate overlapping,
wherein
the discrete elements of at least one of the first and second patterns are distributed randomly,
a part of the discrete elements of the first pattern overlap with a part of the discrete elements of said second pattern, and
the security element is defined by the first pattern, the second pattern and a third pattern formed by the overlap of some or all of the discrete elements of said first and second patterns;
the first material comprises a first fluorescent dye or pigment, which upon excitation by electromagnetic radiation falling within an excitation wavelength range $\lambda 1a$ of the first fluorescent dye or pigment is capable of emitting electromagnetic radiation in at least one first emission wavelength range $\lambda 1e$, and
the second material comprises a second fluorescent dye or pigment, which upon excitation by electromagnetic radiation falling within an excitation wavelength range $\lambda 2a$ of the second fluorescent dye or pigment is capable of emitting electromagnetic radiation in at least one second emission wavelength range $\lambda 2e$, and
wherein said first emission wavelength range $\lambda 1e$ of the first fluorescent dye or pigment overlaps with the excitation wavelength range $\lambda 2a$ of the second fluorescent dye or pigment, so that upon irradiation with electromagnetic radiation within the excitation wavelength range $\lambda 1a$ of the first fluorescent dye or pigment the second fluorescent dye or pigment is excited, in the area of overlap of the discrete elements, to emit electromagnetic radiation in the emission wavelength range $\lambda 2e$.

2. The security element according to claim 1, wherein the first material comprises one or both of a first dye and a first pigment, and the second material comprises one or both of a second dye and a second pigment.

3. The security element according to claim 2, wherein one or more of the dyes and pigments present in the first and second materials is luminescent.

4. The security element according to claim 1, wherein the discrete elements of at least one of the first and second patterns are not visually distinguishable from the substrate.

5. The security element according to claim 4, wherein the discrete elements of one of the first pattern and the second pattern are not visually distinguishable from the substrate, and the discrete elements of the other of the first pattern and the second pattern are visually distinguishable from the substrate.

6. The security element according to claim 1, wherein the second emission wavelength range $\lambda 2e$ does or does not overlap with the first emission wavelength range $\lambda 1e$.

7. The security element according to claim 1, wherein $\lambda 1a\text{-max} < \lambda 1e\text{-max} < \lambda 2e\text{-max}$, wherein $\lambda 1a\text{-max}$, $\lambda 1e\text{-max}$, and $\lambda 2e\text{-max}$ denote the wavelengths of the excitation and emission peaks in the respective excitation and emission wavelength regions of the first dye or pigment and the second dye or pigment, respectively.

8. The security element according to claim 1, wherein the randomly distributed discrete elements are ink spray spatter.

9. A commercial good or value document, comprising a security element, the security element comprising a first and a second pattern formed in or on a substrate,
the first pattern being formed by discrete elements of a first material that are distributed over a first region of the substrate,
the second pattern being formed by discrete elements of a second material that are distributed over a second region of the substrate, said second material being different from said first material, said first and second regions of the substrate overlapping,
wherein
the discrete elements of at least one of the first and second patterns are distributed randomly,
a part of the discrete elements of the first pattern overlap with a part of the discrete elements of said second pattern, and
the security element is defined by the first pattern, the second pattern and a third pattern formed by the overlap of some or all of the discrete elements of said first and second patterns;
the first material comprises a first fluorescent dye or pigment, which upon excitation by electromagnetic radiation falling within an excitation wavelength range $\lambda 1a$ of the first fluorescent dye or pigment is capable of emitting electromagnetic radiation in at least one first emission wavelength range $\lambda 1e$, and
the second material comprises a second fluorescent dye or pigment, which upon excitation by electromagnetic radiation falling within an excitation wavelength range $\lambda 2a$ of the second fluorescent dye or pigment is capable of emitting electromagnetic radiation in at least one second emission wavelength range $\lambda 2e$, and
wherein said first emission wavelength range $\lambda 1e$ of the first fluorescent dye or pigment overlaps with the excitation wavelength range $\lambda 2a$ of the second fluorescent dye or pigment, so that upon irradiation with electromagnetic radiation within the excitation wavelength range $\lambda 1a$ of the first fluorescent dye or pigment the second fluorescent dye or pigment is excited, in the area of overlap of the discrete elements, to emit electromagnetic radiation in the emission wavelength range $\lambda 2e$.

10. A security arrangement comprising
a security element comprising a first and a second pattern formed in or on a substrate,
the first pattern being formed by discrete elements of a first material that are distributed over a first region of the substrate,
the second pattern being formed by discrete elements of a second material that are distributed over a second region of the substrate, said second material being different from said first material, said first and second regions of the substrate overlapping,
wherein
the discrete elements of at least one of the first and second patterns are distributed randomly,
a part of the discrete elements of the first pattern overlap with a part of the discrete elements of said second pattern, and the security element is defined by the first pattern, the second pattern and a third pattern formed by the overlap of some or all of the discrete elements of said first and second patterns;

the first material comprises a first fluorescent dye or pigment, which upon excitation by electromagnetic radiation falling within an excitation wavelength range $\lambda 1a$ of the first fluorescent dye or pigment is capable of emitting electromagnetic radiation in at least one first emission wavelength range $\lambda 1e$, and the second material comprises a second fluorescent dye or pigment, which upon excitation by electromagnetic radiation falling within an excitation wavelength range $\lambda 2a$ of the second fluorescent dye or pigment is capable of emitting electromagnetic radiation in at least one second emission wavelength range $\lambda 2e$, and wherein said first emission wavelength range $\lambda 1e$ of the first fluorescent dye or pigment overlaps with the excitation wavelength range $\lambda 2a$ of the second fluorescent dye or pigment, so that upon irradiation with electromagnetic radiation within the excitation wavelength range $\lambda 1a$ of the first fluorescent dye or pigment the second fluorescent dye or pigment is excited, in the area of overlap of the discrete elements, to emit electromagnetic radiation in the emission wavelength range $\lambda 2e$, and a data record of an index for identifying said third pattern.

11. The security arrangement according to claim 10, comprising a data record of a first index for identifying said first pattern, a data record of a second index for identifying said second pattern and a data record of a third index for identifying said third pattern.

12. A process for producing a security arrangement, the security arrangement comprising a security element comprising a first and a second pattern formed in or on a substrate, the first pattern being formed by discrete elements of a first material that are distributed over a first region of the substrate, the second pattern being formed by discrete elements of a second material that are distributed over a second region of the substrate, said second material being different from said first material, said first and second regions of the substrate overlapping, wherein the discrete elements of at least one of the first and second patterns are distributed randomly, a part of the discrete elements of the first pattern overlap with a part of the discrete elements of said second pattern, and the security element is defined by the first pattern, the second pattern and a third pattern formed by the overlap of some or all of the discrete elements of said first and second patterns;

the first material comprises a first fluorescent dye or pigment, which upon excitation by electromagnetic radiation falling within an excitation wavelength range $\lambda 1a$ of the first fluorescent dye or pigment is capable of emitting electromagnetic radiation in at least one first emission wavelength range $\lambda 1e$, and the second material comprises a second fluorescent dye or pigment, which upon excitation by electromagnetic radiation falling within an excitation wavelength range $\lambda 2a$ of the second fluorescent dye or pigment is capable of emitting electromagnetic radiation in at least one second emission wavelength range $\lambda 2e$, and wherein said first emission wavelength range $\lambda 1e$ of the first fluorescent dye or pigment overlaps with the excitation wavelength range $\lambda 2a$ of the second fluorescent dye or pigment, so that upon irradiation with electromagnetic radiation within the excitation wavelength range $\lambda 1a$ of the first fluorescent dye or pigment the second fluorescent dye or pigment is excited, in the area of overlap of the discrete elements, to emit electromagnetic radiation in the emission wavelength range $\lambda 2e$, and a data record of an index for identifying said third pattern, the process comprising the steps of forming the first pattern by distributing discrete elements of the first material over the first region of the substrate, forming the second pattern by distributing discrete elements of the second material over the second region of the substrate, said second material being different from said first material and said first and second regions of the substrate overlapping, wherein the discrete elements of at least one of the first and second patterns are distributed randomly, and a part of the discrete elements of the first pattern overlap with a part of the discrete elements of said second pattern, the security element being defined by the first pattern, the second pattern and a third pattern formed by the overlap of some or all of the discrete elements of said first and second patterns;

the first material comprising a first fluorescent dye or pigment, which upon excitation by electromagnetic radiation falling within an excitation wavelength range $\lambda 1a$ of the first fluorescent dye or pigment is capable of emitting electromagnetic radiation in at least one first emission wavelength range $\lambda 1e$, and the second material comprising a second fluorescent dye or pigment, which upon excitation by electromagnetic radiation falling within an excitation wavelength range $\lambda 2a$ of the second fluorescent dye or pigment is capable of emitting electromagnetic radiation in at least one second emission wavelength range $\lambda 2e$, and wherein said first emission wavelength range $\lambda 1e$ of the first fluorescent dye or pigment overlaps with the excitation wavelength range $\lambda 2a$ of the second fluorescent dye or pigment, so that upon irradiation with electromagnetic radiation within the excitation wavelength range $\lambda 1a$ of the first fluorescent dye or pigment the second fluorescent dye or pigment is excited, in the area of overlap of the discrete elements, to emit electromagnetic radiation in the emission wavelength range $\lambda 2e$;

generating an index for identifying said third pattern, comprising obtaining an image of said third pattern and applying an indexing routine to said obtained image, and storing said index in a data record.

13. The process of claim 12, comprising generating one or both of a first further index for identifying said first pattern and a second further index for identifying said second pattern, and storing one or both of said first further index and said second further index in a data repository holding said data record of said index.

14. A method for authenticating a security element of a security arrangement, the security arrangement comprising the security element comprising a first and a second pattern formed in or on a substrate, the first pattern being formed by discrete elements of a first material that are distributed over a first region of the substrate, the second pattern being formed by discrete elements of a second material that are distributed over a second region of the substrate, said second material being different from said first material, said first and second regions of the substrate overlapping, wherein the discrete elements of at least one of the first and second patterns are distributed randomly, a part of the discrete elements of the first pattern overlap with a part of the discrete elements of said second pattern, and the security element is defined by the first pattern, the second pattern and a third pattern formed by the overlap of some or all of the discrete elements of said first and second patterns;

the first material comprises a first fluorescent dye or pigment, which upon excitation by electromagnetic radiation falling within an excitation wavelength range $\lambda 1a$ of the first fluorescent dye or pigment is capable of emitting electromagnetic radiation in at least one first emission wavelength range $\lambda 1e$, and the second material comprises a second fluorescent dye or pigment, which upon excitation by electromagnetic radiation falling within an excitation wavelength range $\lambda 2a$ of the second fluorescent dye or pigment is capable of emitting electromagnetic radiation in at least one second emission wavelength range $\lambda 2e$, and wherein said first emission wavelength range $\lambda 1e$ of the first fluorescent dye or pigment overlaps with the excitation wavelength range $\lambda 2a$ of the second fluorescent dye or pigment, so that upon irradiation with electromagnetic radiation within the excitation wavelength range $\lambda 1a$ of the first fluorescent dye or pigment the second fluorescent dye or pigment is excited, in the area of overlap of the discrete elements, to emit electromagnetic radiation in the emission wavelength range $\lambda 2e$, and a data record of an index for identifying said third pattern, the method comprising the steps of obtaining an image of said third pattern and applying a predetermined indexing routine to said obtained image, for generating an index of said third pattern, accessing a repository of said data records, comparing said generated index with content from said repository, and making an genuineness decision based on said comparing step.

15. The method according to claim 14, comprising the additional steps of obtaining an image of said first pattern and applying a predetermined first indexing routine to said obtained image, for generating a first index of said first pattern, accessing said repository of said data records, and comparing said generated first index with content from said repository, wherein said authentication decision is also based on said comparing of said generated first index with said content from said repository.

16. The method according to claim 14, comprising the additional steps of obtaining an image of said second pattern and applying a predetermined second indexing routine to said obtained image, for generating a second index of said second pattern, accessing said repository of said data records, and comparing said generated second index with content from said repository, wherein said authentication decision is also based on said comparing of said generated second index with said content from said repository.

* * * * *